(12) United States Patent
Elwell et al.

(10) Patent No.: US 10,859,229 B1
(45) Date of Patent: Dec. 8, 2020

(54) LIGHT BAR USING SURFACE-MOUNT TECHNOLOGY

(71) Applicant: Putco, Inc., Des Moines, IA (US)

(72) Inventors: James P. Elwell, Grimes, IA (US);
James P. Elwell, II, Grimes, IA (US);
Joshua J. Burhite, Des Moines, IA (US); Tian Xiaojun, Guangzhou (CN)

(73) Assignee: Putco, Inc., Des Moines, IA (US)

( * ) Notice: Subject to any disclaimer, the term of this patent is extended or adjusted under 35 U.S.C. 154(b) by 69 days.

(21) Appl. No.: 16/673,434

(22) Filed: Nov. 4, 2019

(51) Int. Cl.
| | | |
|---|---|---|
| *F21S 43/14* | (2018.01) | |
| *F21S 43/19* | (2018.01) | |
| *H05B 33/04* | (2006.01) | |
| *H05B 45/20* | (2020.01) | |
| *B60Q 1/34* | (2006.01) | |
| *F21Y 115/10* | (2016.01) | |
| *F21Y 113/17* | (2016.01) | |
| *F21W 103/20* | (2018.01) | |
| *F21Y 103/10* | (2016.01) | |
| *F21W 103/35* | (2018.01) | |
| *F21W 103/30* | (2018.01) | |
| *F21W 103/45* | (2018.01) | |

(Continued)

(52) U.S. Cl.
CPC ............. *F21S 43/14* (2018.01); *F21S 43/195* (2018.01); *H05B 33/04* (2013.01); *H05B 45/20* (2020.01); *B60Q 1/22* (2013.01); *B60Q 1/34* (2013.01); *B60Q 1/44* (2013.01); *B60Q 2400/20* (2013.01); *F21W 2103/20* (2018.01); *F21W 2103/30* (2018.01); *F21W 2103/35* (2018.01); *F21W 2103/45* (2018.01); *F21Y 2103/10* (2016.08); *F21Y 2113/17* (2016.08); *F21Y 2115/10* (2016.08)

(58) Field of Classification Search
CPC ........ F21S 43/14; F21S 43/195; F21S 43/237; H05B 45/20; H05B 33/04; H05B 33/08; B60Q 1/22; B60Q 1/34; B60Q 1/44
See application file for complete search history.

(56) References Cited

U.S. PATENT DOCUMENTS

| | | | |
|---|---|---|---|
| 2010/0008090 A1* | 1/2010 | Li | F21V 17/007 362/249.03 |
| 2013/0021811 A1* | 1/2013 | Goldwater | B62J 6/00 362/473 |

(Continued)

*Primary Examiner* — Alexander H Taningco
*Assistant Examiner* — Pedro C Fernandez
(74) *Attorney, Agent, or Firm* — McKee, Voorhees & Sease, PLC

(57) ABSTRACT

A light bar has a circuit board positioned within a housing and having light emitting diodes (LEDs) which are mounted to a surface of the circuit board with surface-mount technology (SMT). The housing has wiring electrically connected to a controller. The controller is configured to receive signals from the electrical system of the vehicle, interpret the signals received from the electrical system of the vehicle, and in response automatically control illumination of independently controllable LEDs. The controller is initially programmed to perform specific function(s) and/or strobe according to specific patterns and is thereafter at least partially restricted from being reprogrammed by a user to serve other function(s), either by restricting the emission of light in at least one color and/or preventing specific strobing pattern(s).

20 Claims, 22 Drawing Sheets

(51) Int. Cl.
*B60Q 1/44* (2006.01)
*B60Q 1/22* (2006.01)

(56) References Cited

U.S. PATENT DOCUMENTS

| | | | |
|---|---|---|---|
| 2013/0107514 A1* | 5/2013 | McNabb | F21V 21/00 |
| | | | 362/231 |
| 2015/0266411 A1* | 9/2015 | Bennie | B60Q 1/2611 |
| | | | 701/36 |
| 2018/0119915 A1* | 5/2018 | Elwell | F21S 43/14 |
| 2018/0206300 A1* | 7/2018 | Farnsworth | F21S 4/28 |

* cited by examiner

 Light bar turns off for 1 pulse then turns back on.
 Light bar pulses 3 times.
 Manual Operation
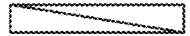 Light bar is not Illuminated.
- ☒ RED
- ◩ BLUE
- ▨ AMBER
- ☐ WHITE
WHITE OVER-RIDE
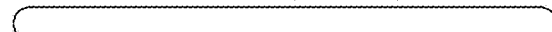
AMBER/AMBER
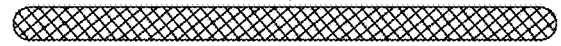
BLUE/BLUE
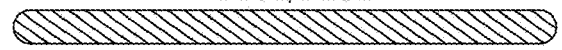
OFF/BLUE
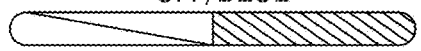
OFF/AMBER
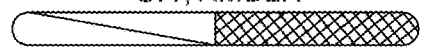
AMBER/OFF
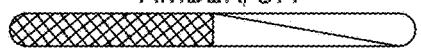
BLUE/OFF
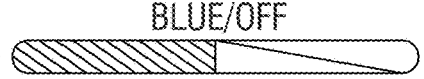
AMBER/BLUE
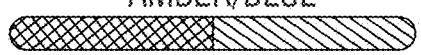
BLUE/AMBER
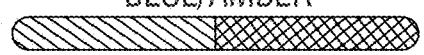
OFF/WHITE
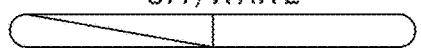
OFF/AMBER
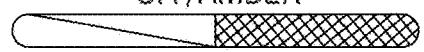
AMBER/OFF
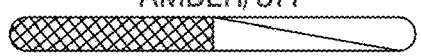
WHITE/OFF
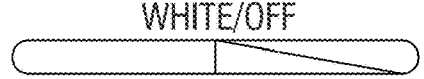
AMBER/WHITE
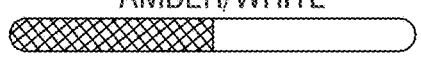
WHITE/AMBER
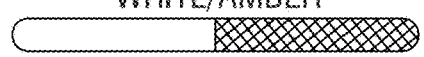
*FIG. 14*

LIGHT BAR USING SURFACE-MOUNT TECHNOLOGY

FIELD OF THE INVENTION

This invention relates to lights. More specifically, and without limitation, this invention relates to an aftermarket programmable light bar which can mounted to and used in connection with a vehicle having an electrical system.

BACKGROUND OF THE INVENTION

The background description provided herein gives context for the present disclosure. Work of the presently named inventors, as well as aspects of the description that may not otherwise qualify as prior art at the time of filing, are neither expressly nor impliedly admitted as prior art.

Vehicle lights are old and well known. Countless forms of vehicle lights exist, including: headlights, fog lights, tail lights, reverse lights, parking lights, daytime running lights, and turning lights, among countless others. Each type of light or light configuration serves its own unique purpose and provides its own unique advantages.

With improvements in light technology, such as the development of light emitting diodes ("LEDs"), a great variety of accessory lights have been developed. These accessory lights come in a wide array of configurations and provide their own unique functions and advantages.

One common form of an accessory light is known as a light bar. Light bars are designed to fit in the small space between the upper edge of the bumper and the lower edge of the tailgate of a pickup truck and include a long array of lights that are electrically connected to the electrical system of the vehicle. These light bars provide improved illumination and thereby improve visibility when breaking, turning and backing up.

While conventional light bars provide many advantages, they suffer from many disadvantages not solved by the prior art. Namely, the lighting patterns and capabilities of known light bars are either manually set by an operator of the vehicle or interpreted in response to signals directly received from the electrical system of the vehicle, thereby controlling illumination of the LEDs of the light bar. No known light bars include the option to manually set a lighting pattern while simultaneously interpreting signals directly received from the electrical system of the vehicle. Furthermore, there are no known light bars which reconcile whether a manual instruction from an operator of the vehicle or an automatic system for interpreting signals directly received from the electrical system of the vehicle should have priority over the other during simultaneous use.

There exists a need in the art for a light bar that allows the operator to send an input to the light bar for a specific pattern of lights while the light bar simultaneously interprets signals directly received from the electrical system. There exists a further need in the art for a light bar which does not require the user to provide the input for the specific pattern of lights and/or restricts the user to using only a number of predetermined patterns and/or colors. There exists an even further need in the art for a light bar which harmonizes which lights should light up in the event these instructions conflict with one another.

SUMMARY OF THE INVENTION

Therefore, it is a primary object, feature, or advantage of the invention to improve on or overcome the deficiencies in the art.

It is still yet a further object, feature, or advantage of the invention to provide a light bar that may be used in a wide variety of applications and may be implemented on and used universally with almost any vehicle, including police cars, fire trucks, security vehicles, and ambulances.

It is still yet a further object, feature, or advantage of the invention to provide a light bar having LEDs of various colors. For example, the light bar may include white LEDs, red LEDs, amber LEDs, blue LEDs, green LEDs, etc. The light bar may include solid or split color variations, and the color variations may be changeable by remote control.

It is still yet a further object, feature, or advantage of the invention to provide a light bar having single stock-keeping unit (SKU) which is capable of preforming several functions, emitting light in several different colors, and/or strobing light according to several different patterns; programmed for performing a specific function selected from the total group of capable functions, emitting light in some of the several different colors, and/or strobing light according to some of the several different patterns; and, later, restricted from preforming at least one function, emitting light in at least one color, and/or strobing light according to one pattern.

It is still yet a further object, feature, or advantage of the invention to provide a light bar having, preferably, surface-mount device (SMD) chips.

It is still yet a further object, feature, or advantage of the invention to provide a semi-flexible or flexible light bar for allowing installation on gradually curved surfaces.

It is still yet a further object, feature, or advantage of the invention to provide light bars of various sizes that fit in the space between the bumper and the tailgate of most trucks, mount inside the vehicle in various window locations or outside of the vehicle at any external location on the vehicle and are included with tool boxes or other objects associated with the vehicle.

It is still yet a further object, feature, or advantage of the invention to provide a clip for mounting the light bar to any of the locations listed above or any other suitable location on a vehicle.

It is still yet a further object, feature, or advantage of the invention to provide a light bar that improves the safety of drivers.

It is still yet a further object, feature, or advantage of the invention to provide a cost effective and durable (e.g., water, weather, and contaminant proof) light bar.

It is still yet a further object, feature, or advantage of the invention to provide a light bar that is aesthetically pleasing.

It is still yet a further object, feature, or advantage of the invention to practice methods which facilitate use, manufacture, transport, installation, uninstallation, repair, assembly, disassembly, storage, and the cleaning of a light bar.

It is still yet a further object, feature, or advantage of the present invention to incorporate an apparatus into a system accomplishing some or all of the previously stated objectives.

The previous objects, features, and/or advantages of the present invention, as well as the following aspects and/or embodiments, are not exhaustive and do not limit the overall disclosure. No single embodiment need provide each and every object, feature, or advantage. Any of the objects, features, advantages, aspects, and/or embodiments disclosed herein can be integrated with one another, either in full or in part.

According to some aspects of the present disclosure, a vehicle light bar comprises a circuit board positioned within a housing and having light emitting diodes (LEDs) mounted to a surface of the circuit board with surface-mount technology (SMT), said LEDs capable of transmitting and varying an intensity of light in at least three different colors of an additive color model, such as the RGB color model. The housing has wiring electrically connected to a control box, said control box including logic for automatically and independently illuminating each of the LEDs and a processor, said processor programmed to control light emission according to one or more selected strobing patterns.

According to some additional aspects of the present disclosure, the vehicle light bar includes space between an outward facing surface of the circuit board and an inward facing surface of the housing which is filled with an encapsulant, thereby sealing the LEDs within the housing. The encapsulant can be formed of a flowable plastic injected into space between the outward facing surface of the circuit board and the inward facing surface of the housing. A portion of the housing covering the LEDs can be formed of a transparent or translucent plastic material. The housing can be formed of a back wall, a pair of opposing sidewalls and a cover, wherein the cover is formed of a convex curved shape. The outward facing surface of the circuit board can be black in color thereby minimizing the noticeability of the vehicle light bar when not in operation. The wiring can include a fuse and a signal lead at an end of the vehicle light bar. The wiring can comprise gold.

According to some additional aspects of the present disclosure, an SMD assembly comprises the LEDs and other SMT components, said other SMT components comprising at least several resistors and a capacitor, having no leads. The SMD assembly can comprise at least three LEDs selected from the group consisting of a red LED, a blue LED, a green LED, and a white LED. The microprocessor can be programmed to automatically illuminate red light while breaking, amber light while the vehicle is turning, and white light while the vehicle is driven in reverse. The microprocessor can be programmed to illuminate blue white, white light, and red light during an emergency. The microprocessor can be programmed to illuminate white light and amber light during work or construction related tasks. The light bar can comprise several SMD assemblies forming groupings which are controlled by separate microprocessors. Each of the groupings can comprise three SMD assemblies. The controller can be further configured to select between colors or strobing patterns in response to receiving the signals from the electrical system of the vehicle. The controller can be further configured to select the duration of illumination of the LEDs in response to receiving the signals from the electrical system of the vehicle. The selected color or strobing pattern can be emergency related or construction related.

According to some other aspects of the present disclosure, a method of manufacturing a vehicle light bar comprises positioning a circuit board having light emitting diodes (LEDs) mounted to a surface of the circuit board with surface-mount technology (SMT), electrically connecting a controller to the LEDs, said controller having a processor and memory, configuring the controller to receive signals from the electrical system of the vehicle, interpret the signals received from the electrical system of the vehicle, and in response automatically control illumination of the LEDs, and programming the microprocessor to control light emission according to one or more selected strobing patterns and/or in one or more colors. The controller includes logic for automatically and independently illuminating the LEDs.

The vehicle light bar can be mounted onto a vehicle, a support bar attached to the vehicle, and/or an accessory of the vehicle. After mounting, the controller can be electrically connected to the electrical system of the vehicle.

These and/or other objects, features, advantages, aspects, and/or embodiments will become apparent to those skilled in the art after reviewing the following brief and detailed descriptions of the drawings.

BRIEF DESCRIPTION OF THE DRAWINGS

FIG. 14 shows possible color combinations and strobing patterns associated with a work light bar, according to some aspects of the present disclosure.

Figure 1A:
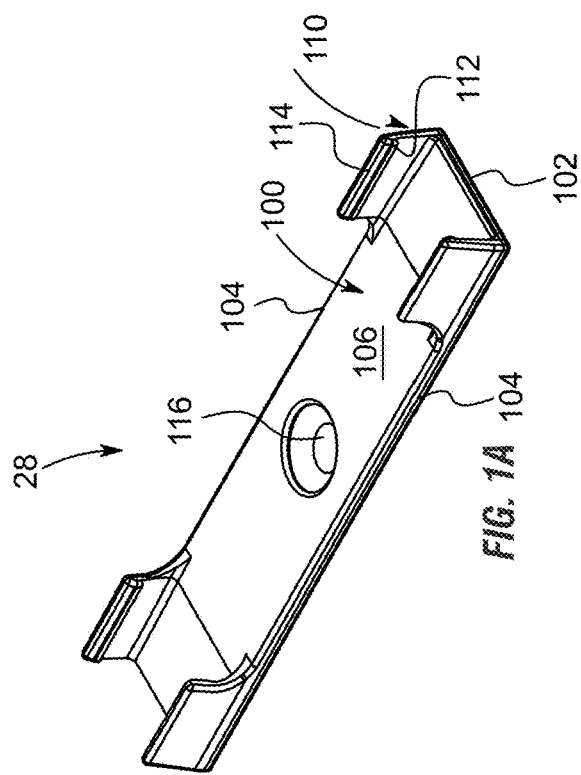
FIG. 1A is a perspective view of a clip for use with the vehicle light bar system presented herein, the clip is configured to attach to the body of a vehicle using adhesive and/or a fastener, the clip includes a back wall that is generally planar in shape and includes opposing arms positioned in each corner of the back wall that extend upward therefrom, the arms include a feature positioned at the outward end of opposing arms that extend toward one another, this feature is configured to grip onto the light bar when the light bar is forced between the opposing arms thereby holding the light bar within the clip, the outward ends of the arms also include a guiding surface angles toward the open interior of the clip that is configured to guide the light bar between opposing arms, according to some aspects of the present disclosure.
Figure 1D:
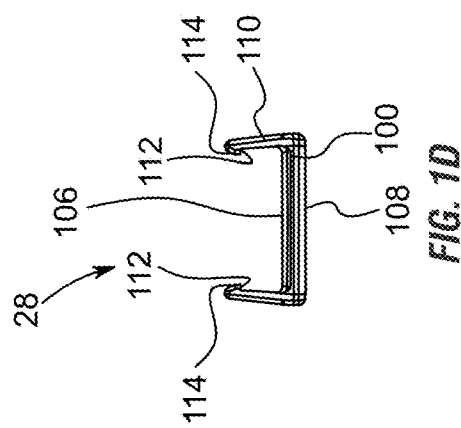
FIG. 1D is an elevation view of the clip shown in FIGS. 1A, 1B, and 1C, the view taken from the end of the clip, the view showing the distance between opposing arms that extend upward a distance from the back wall; the view showing the feature positioned at the outward end of opposing arms that extend toward one another, this feature is configured to grip onto the light bar when the light bar is forced between the opposing arms thereby holding the light bar within the clip, the view also shows the guiding surface positioned at the outward ends of the arms that angles toward the open interior of the clip that is configured to guide the light bar between opposing arms, according to some aspects of the present disclosure.
Figure 1B:
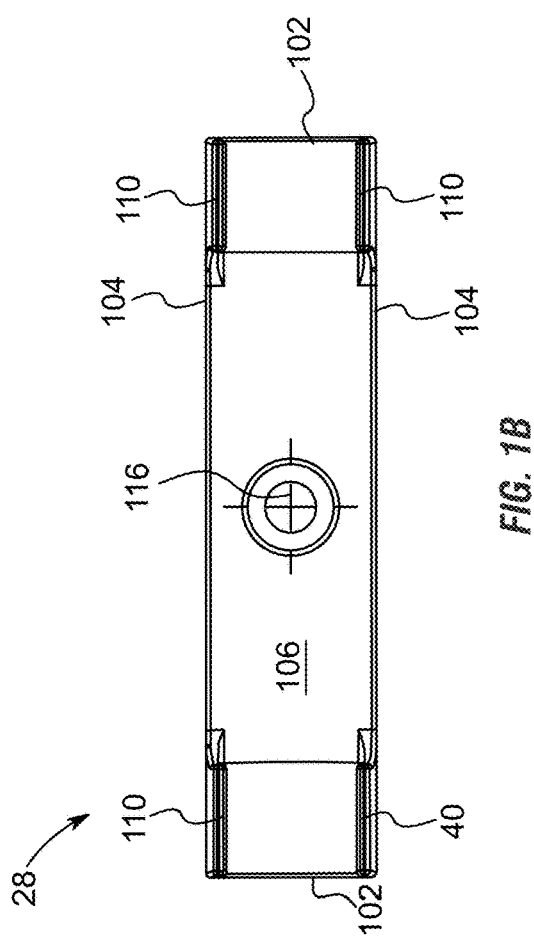
FIG. 1B is an elevation view of the clip shown in FIG. 1A, the view taken from the top surface of the clip, according to some aspects of the present disclosure.
Figure 1C:
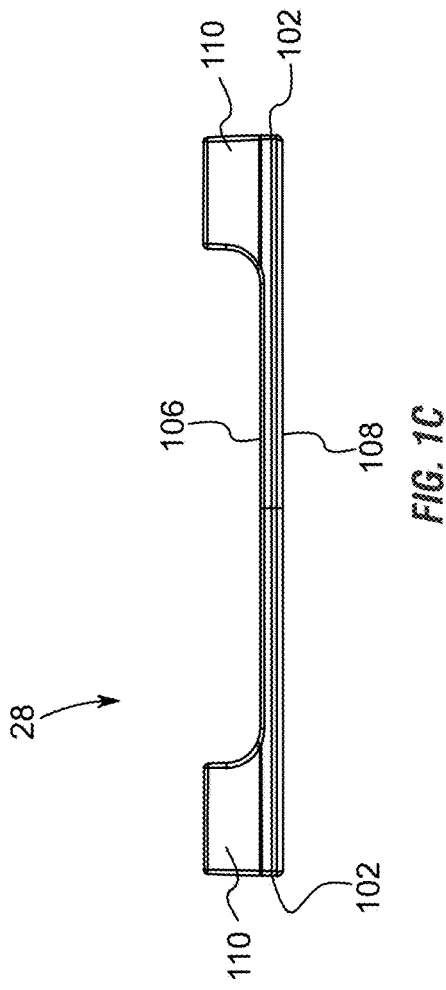
FIG. 1C is an elevation view of the clip shown in FIGS. 1A and 1B, the view taken from the side surface of the clip, the view showing the arms extending upward a distance from the back wall, according to some aspects of the present disclosure.

Several embodiments in which the present invention may be practiced are illustrated and described in detail, wherein like reference numerals represent like components throughout the several views. The drawings are presented for exemplary purposes and may not be to scale, unless otherwise indicated, and thus proportions of features in the drawings shall not be construed as evidence of actual proportions.

DETAILED DESCRIPTION

Definitions—Introductory Matters

The following definitions and introductory matters are provided to facilitate an understanding of the present invention. Unless defined otherwise, all technical and scientific terms used herein have the same meaning as commonly understood by one of ordinary skill in the art to which embodiments of the present invention pertain.

The terms "a," "an," and "the" include singular and plural referents.

The term "or" is synonymous with "and/or" and means any one member or combination of members of a particular list.

The terms "invention" or "present invention" as used herein are not intended to refer to any single embodiment of the particular invention but encompass all possible embodiments as described in the specification and the claims.

The term "about" as used herein refers to slight variations in numerical quantities with respect to any quantifiable variable. One of ordinary skill in the art will recognize inadvertent error can occur, for example, through use of typical measuring techniques or equipment or from differences in the manufacture, source, or purity of components. The claims include equivalents to the quantities whether or not modified by the term "about."

The term "configured" describes an apparatus, system, or other structure that is constructed to perform or capable of performing a particular task or to adopt a particular configuration. The term "configured" can be used interchangeably with other similar phrases such as constructed, arranged, adapted, manufactured, and the like.

Numerical adjectives and adverbs (e.g., first, second, etc.), positional adjectives and adverbs (e.g., vertical, horizontal, forward, aft, etc.), and nouns describing orientation of an object (e.g., top, bottom, sides, etc.), are referenced according to the views presented. Unless context indicates otherwise, these terms are not limiting. The physical configuration of an object or a combination of objects may change without departing from the scope of the present invention.

The light bar described herein is described, as one example, for use with a pickup truck. This is by way of example only, and any use is hereby contemplated and reference to use on a pickup truck is not to be limiting. Instead, the light bar presented herein is contemplated for use in any application and may be used on any vehicle. In addition, the shape and dimensions of the light bar can be modified without departing from the spirit and scope of the invention.

In communications and computing, a computer readable medium is a medium capable of storing data in a format readable by a mechanical device. The term "non-transitory" is used herein to refer to computer readable media (CRM) that store data for short periods or in the presence of power such as a memory device or random-access memory (RAM).

A processing unit, also called a processor, is an electronic circuit which performs operations on some external data source, usually memory or some other data stream. Non-limiting examples of processors include a microprocessor, a microcontroller, an arithmetic logic unit ("ALU"), and most notably, a central processing unit ("CPU"). A CPU, also called a central processor or main processor, is the electronic circuitry within a computer that carries out the instructions of a computer program by performing the basic arithmetic, logic, controlling, and input/output ("I/O") operations specified by the instructions.

One or more embodiments described herein can be implemented using programmatic modules, engines, or components. A programmatic module, engine, or component can include a program, a sub-routine, a portion of a program, or a software component or a hardware component capable of performing one or more stated tasks or functions. A module or component can exist on a hardware component independently of other modules or components. Alternatively, a module or component can be a shared element or process of other modules, programs, or machines.

As would be apparent to one of ordinary skill in the art, mechanical, procedural, or other changes may be made without departing from the spirit and scope of the invention. The scope of the invention is defined only by the appended claims, along with the full scope of equivalents to which such claims are entitled.

Overview

Figure 16:
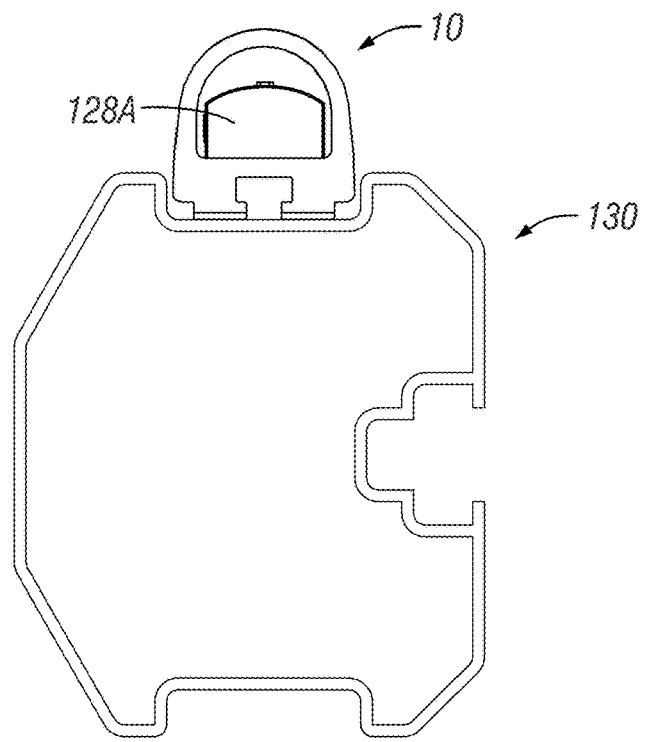
FIG. 16 shows an end perspective view of vehicle light bar system attached to a support bar which can mount to an automobile, according to some aspects of the present disclosure.
Figure 17:
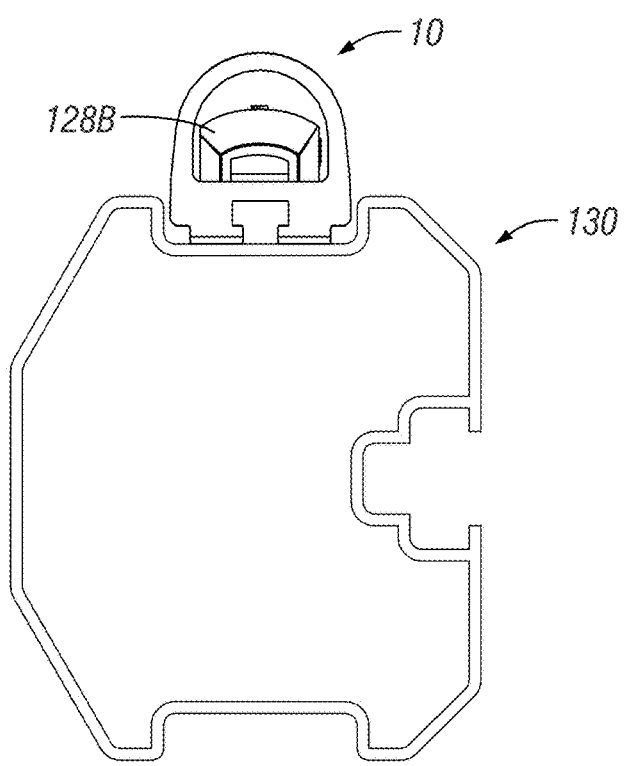
FIG. 17 shows an opposite end perspective view of vehicle light bar system attached to a support bar which can mount to an automobile, according to some aspects of the present disclosure.

System:

With reference to the figures, light bar system 10 is presented (also referred to herein as light bar 10 and/or system 10). The system 10 includes the component pieces of housing 12, circuit board 14 which is separated into segments 16, end caps 18, encapsulant 20, control box 22 having a microprocessor 24 and memory 26, among other components as is described herein. The system 10 also includes one or more clips 28 that facilitate connection of the light bar 10 to a truck or vehicle 30, an accessory mounted to the truck or vehicle 30, and/or a support bar 130 mountable to the truck or vehicle 30 (such as the one shown in FIGS. 16 and 17 or the "vehicle accessory bar" disclosed in U.S. patent application Ser. No. 15/964,311, which is commonly owned and herein incorporated by reference in its entirety).

Housing:

Housing 12 is formed of any suitable size, shape and design and is configured to house the electrical components of the light bar system 10. In one arrangement, as is shown, housing 12 is an elongated hollow member that extends a length between opposing ends that are closed by end caps 18. Housing 12 includes a back wall 32 that is generally flat and planar in shape when viewed from the side. The upper and lower edges of back wall 32 that extend the length of housing 12 connect to opposing sidewalls 34. Like back wall 32, sidewalls 34 are generally flat and planar in shape. Opposing sidewalls 34 connect at their rearward edges to the upper and lower edges of back wall 32 and extend in approximate parallel spaced alignment to one another. Sidewalls 34 extend in approximate perpendicular alignment to back wall 32. This arrangement, with the generally planar and perpendicular alignment of the back wall 32 and side walls 34 form a generally rectangular space between the back wall 32 and opposing side walls 34, as can be seen from the side cut away view of FIGS. 3 and 4.

The forward edges of sidewalls 34 connect to a cover portion 36 of housing 12. In the arrangement shown, cover portion 36 has a generally smooth and curved exterior surface that connects at its upper and lower edges to the forward edges of sidewalls 34. In the arrangement shown, cover portion 36 has a convex exterior surface, and a concave interior surface, that helps to shed water, dirt and contaminants off of the housing. However, any other size, shape and design is contemplated for use as cover portion 36, including a flat and square shape, a peaked shape, a concave shape or any other shape.

Figure 3:
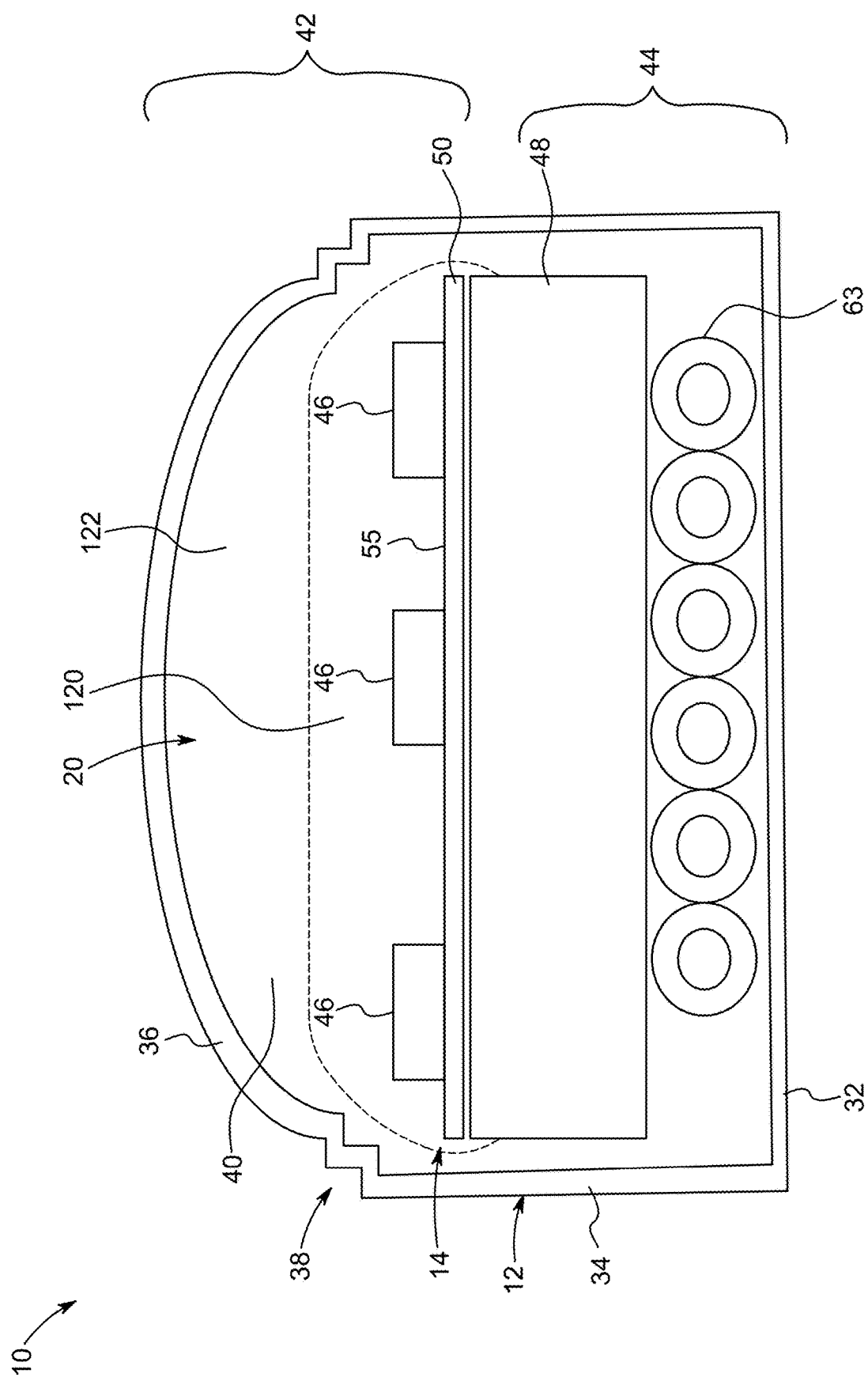
FIG. 3 is an elevation view of a side cut away of the assembled housing of the light bar, the view showing the housing having a back wall, opposing side walls and a cover with a pair of right angled steps that serve as features positioned between the cover and the sidewalls, the view showing the circuit board formed of a backing material, circuitry layer and LEDs positioned within the hollow interior of the housing, the view showing the ribbon wire extending below the backing material of the circuit board, the view showing the first layer of encapsulant encapsulating the outward facing surface of the circuit board including the three rows of LEDs, the view also showing the second layer of encapsulant the essentially fills all the remaining space within the hollow interior of the housing thereby fully encapsulating the circuit board and all other components positioned within the hollow interior of the housing, according to some aspects of the present disclosure.
Figure 4:
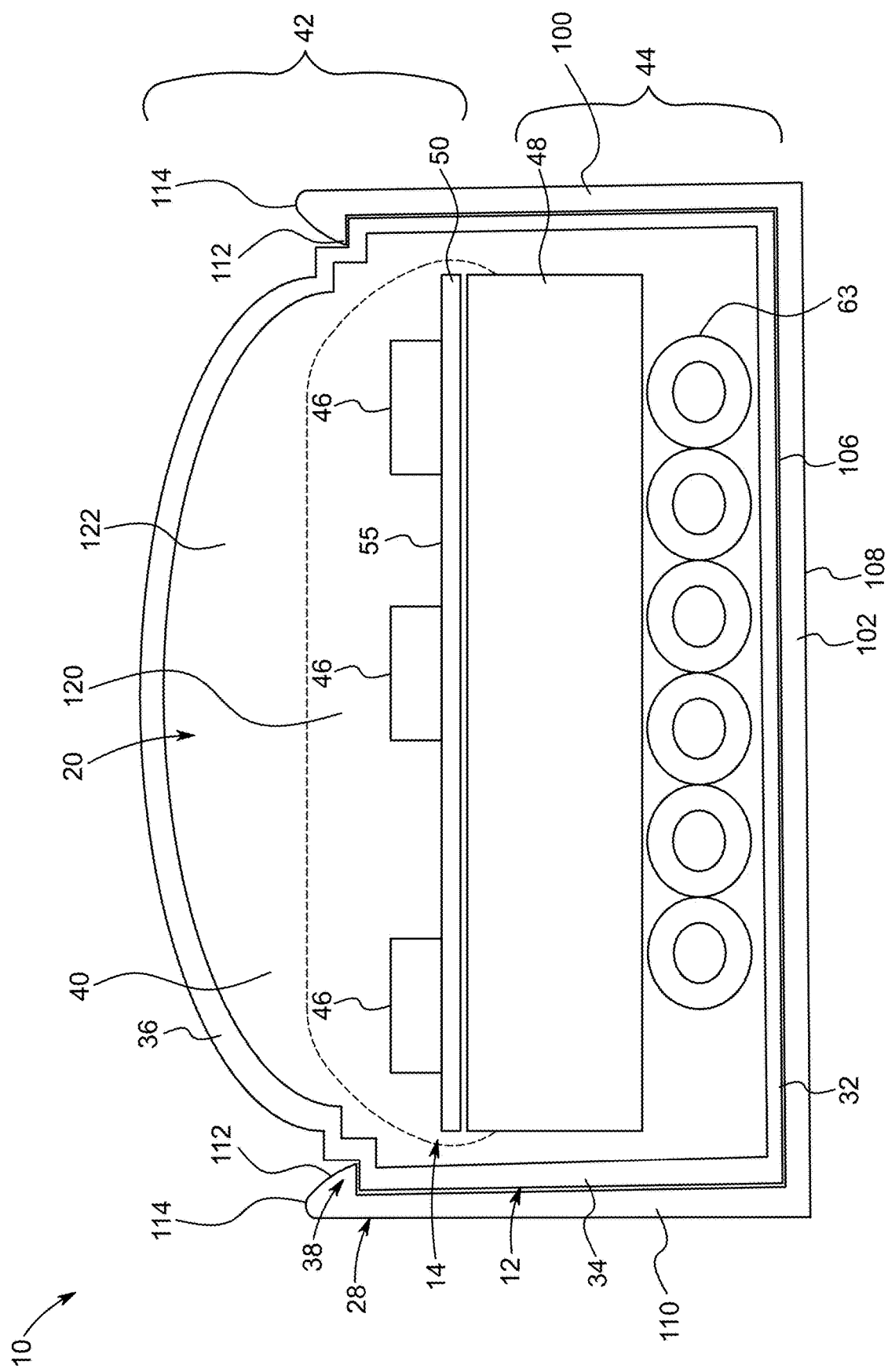
FIG. 4 is a side elevation view of a side cut away of the assembled housing of the light bar of FIG. 3, the view showing the addition of the clip shown in FIGS. 1A-1D attached to the exterior of the housing, the view showing the features of the arms of the clip connected to and holding onto the features of the housing positioned between the sidewalls of the housing and the cover of the housing, the view showing the interior surface of the sidewalls of the arms in approximately flat and flush engagement with the exterior surface of the sidewalls of the housing, the view showing the exterior surface of the back wall of the housing in approximately flat and flush engagement with the forward surface of the back wall of the clip, according to some aspects of the present disclosure.
Figure 5:
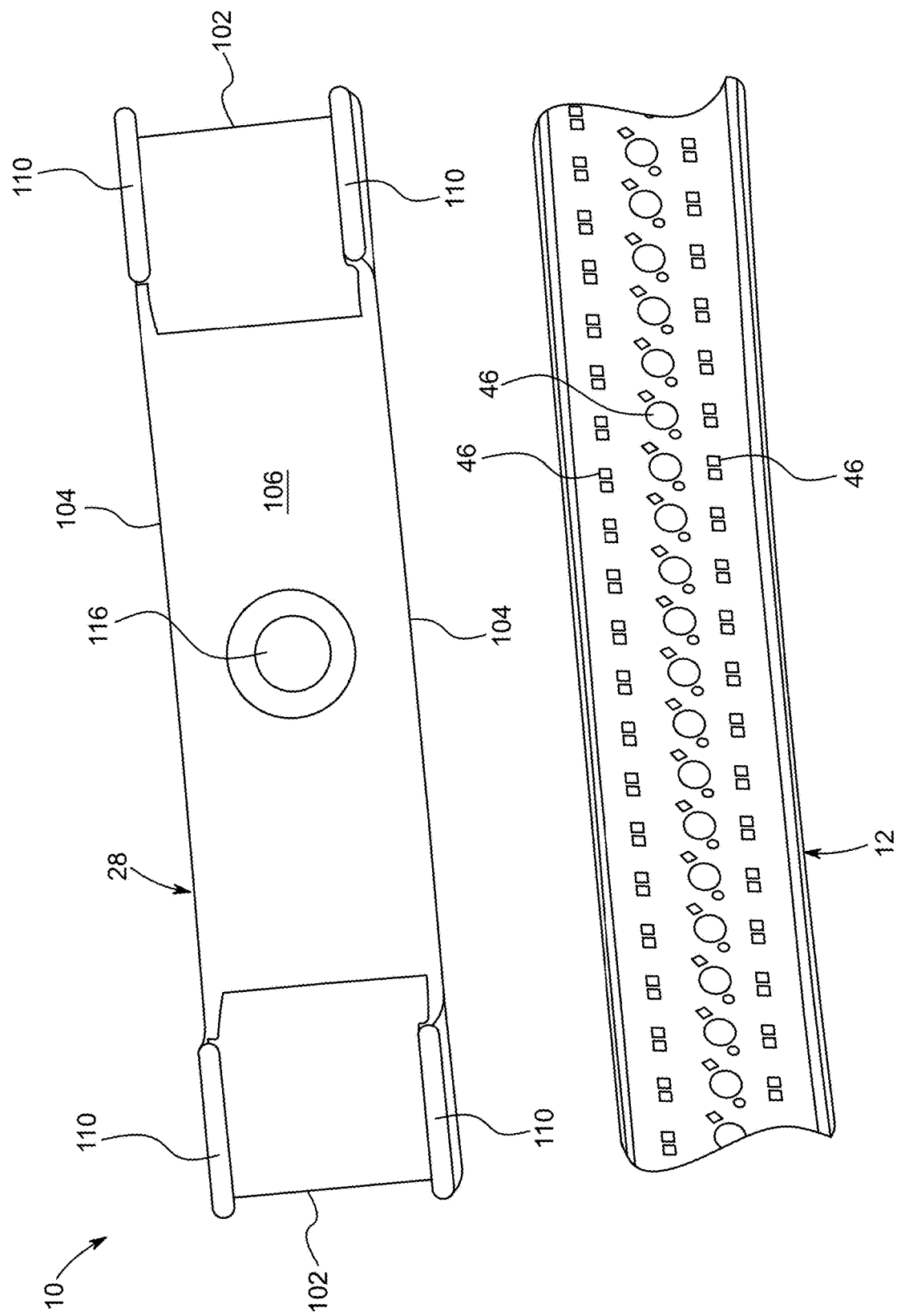
FIG. 5 is a perspective view of the clip of FIGS. 1A-1D shown in a side by side position to a portion of the housing of the light bar, according to some aspects of the present disclosure.
Figure 6:
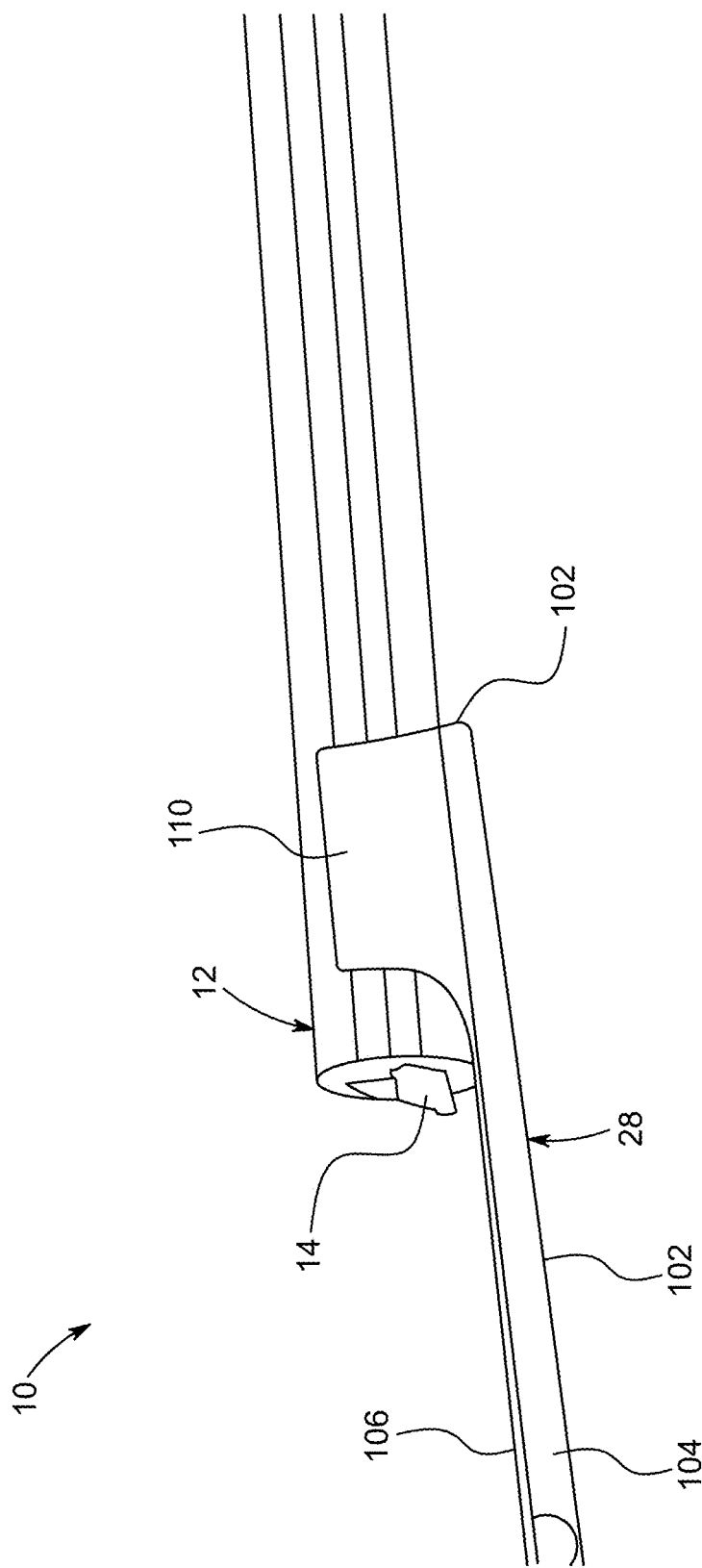
FIG. 6 is a perspective view of the clip of FIGS. 1A-1D shown partially installed on a portion of the housing of the light bar, the view showing one end of the light bar installed on the clip and one end of the light bar not installed on the clip, according to some aspects of the present disclosure.
Figure 7:
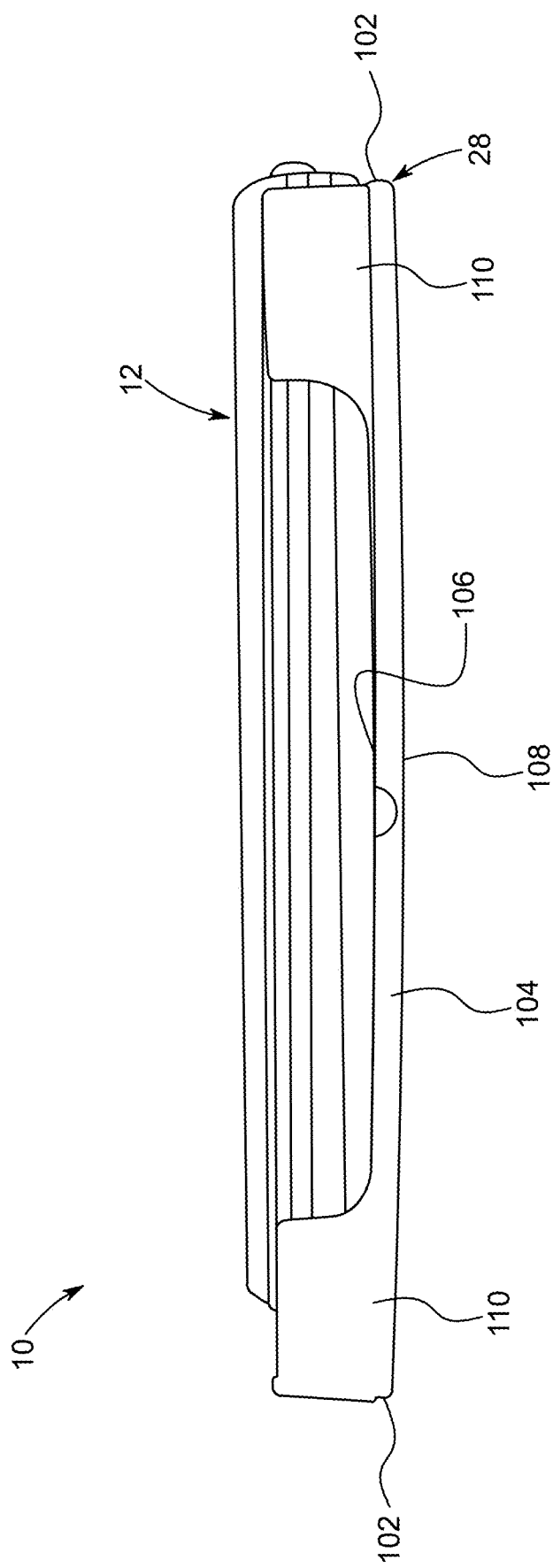
FIG. 7 is a perspective view similar to FIG. 6 with the portion of the housing fully installed within the clip, according to some aspects of the present disclosure.
Figure 8:
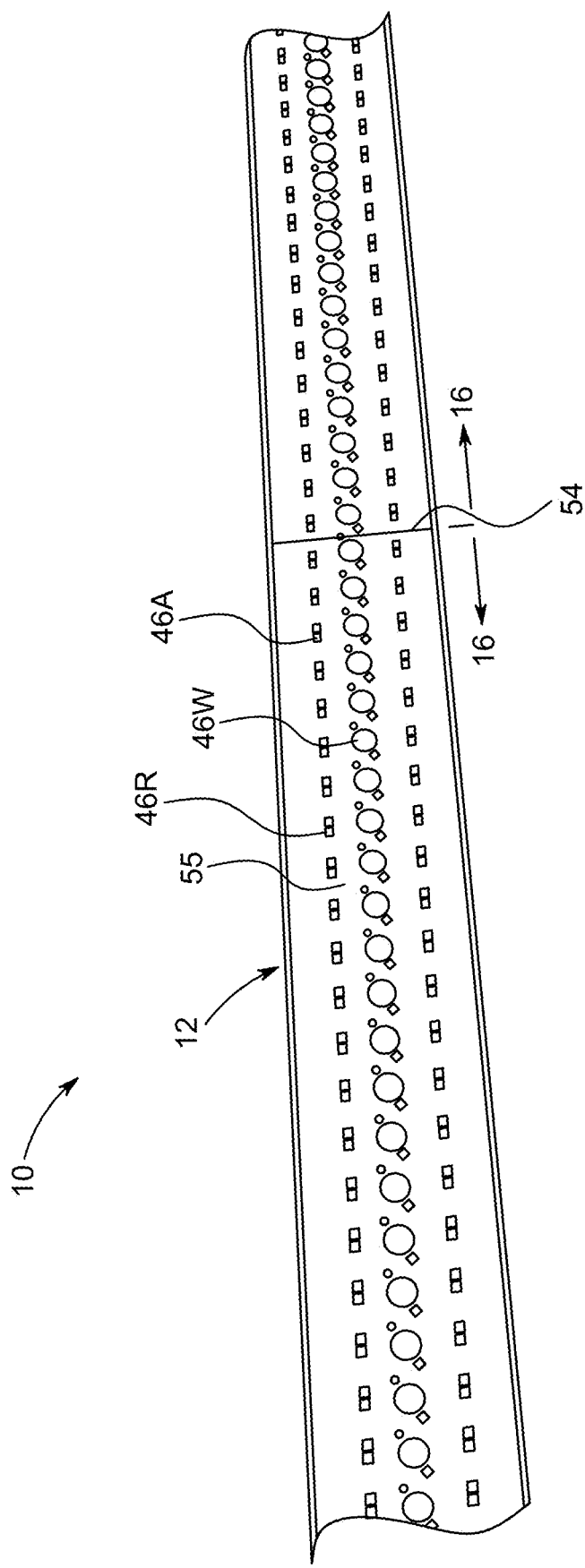
FIG. 8 is a perspective view of the fully assembled light bar, the view showing three rows of LEDs visible through the transparent portion of the housing, a row of red LEDs, a row of white LEDs and a row of amber LEDs, according to some aspects of the present disclosure.

In one arrangement, as is shown, one or more features 38 are positioned at the intersection or connection point between sidewalls 34 and cover portion 36. Features 38 are formed of any suitable size, shape and design and are configured to support the engagement between and connection of clip 28 to housing 12 and to facilitate a strong and durable hold there between while also facilitating selective removal of housing 12 from clip 28. As one example, as is shown, features 38 include a first step or ledge positioned between the exterior surface of sidewalls 34 and where cover portion 36 connects to sidewalls 34. In this arrangement, the first step of features 38 include a small generally planar portion that extends in approximate parallel spaced relation to back wall 32 which serves as a connection point for clip 28 to hold on to and secure housing 12. That is, in the arrangement shown, the first step of features 38 is a small generally right angle notch or step between sidewall 34 and cover portion 36 when viewed from the side as can be seen in FIGS. 3 and 4. Also, in the arrangement shown, a second step is also positioned just above the first step of features 38 and is configured in a similar manner. That is, in the arrangement shown, the second step of features 38 is a small generally right angle notch or step between sidewall 34 and cover portion 36 that connects at its lower or outward side to the first step of features and connects at its upper or outward side to cover portion 38 when viewed from the side as can be seen in FIGS. 3 and 4. In the arrangement wherein more than one step is present in features 38, clip 28 may connect to only one of the steps or both of the steps. Any number of steps is hereby contemplated for use as features 38 such as none, one, two, three, four or more. Alternatively, any other size, shape and design for features 38 is hereby contemplated for use, such as a hook, a concave recess that is recessed inward toward back wall 32, a protrusion or any other shaped feature 38, which in some configurations or applications may provide a more-affirmative and durable connection between clip 28 and housing 12.

The connection of back wall 32, sidewalls 34 and cover portion 36 define a hollow interior 40 there between which houses and holds circuit board 14 therein. In one arrangement, housing 12 is formed of a single monolithic piece or extrusion and therefore the features, size and shape of housing 12 extend the length of housing 12. Being formed of a single piece reduces the number of parts, simplifies the manufacturing process in many ways (and complicates it in other ways) and provides enhanced water proofing and contaminant protection as there are no seams or connection points for infiltration of water or contaminants into the hollow interior 30 of housing 12. As such, the hollow interior 40 of housing 12 serves as a complete or as close to a complete shield to water and contaminants as is possible. This arrangement provides enhanced the water and contaminant protection for the components positioned within the hollow interior 40 of housing 12. To provide further protection, the components positioned within the hollow interior 40 of housing 12 are encapsulated in an encapsulant 20 as is further described herein. Having a consistent size and shape throughout the length of housing 12 facilitates easier installation as clip 28 can be positioned along any portion of housing 12 and the components can be inserted into hollow interior 40 of housing 12 from either end and these components may be slid along the length of hollow interior 40 of housing 12 during installation.

In the arrangement shown, housing 12 includes a transparent portion 42 and a non-transparent portion 44. In one arrangement, the back wall 32 and the sidewalls 34 or only the rearward portions of sidewalls 34 of housing 12 are painted with a black or dark or non-transparent paint which is placed on the exterior and/or the interior of housing 12. Alternatively these portions of housing 12 (back wall 32 and all or a portion of sidewalls 34) are formed of a black or dark or non-transparent material that prevents or reduces light transmission there through. In this arrangement, the cover portion 36 and the forward portions of sidewalls 34 of housing 12 are formed of a clear, transparent, translucent or other material that allows light to be transmitted there through. In one arrangement, the color black has been tested with success as it reduces the appearance of the system 10 when installed on vehicle 30. In the arrangement where the back wall 32 and sidewalls 34 and the cover portion 36 are formed of different colored materials, the back wall 32 and sidewalls 34 are manufactured as a single unitary piece of two different colored materials or two materials with different colors and light-transmission properties, such as a co-extrusion process or the like so as to form a single unitary and simultaneously manufactured piece without seams or other areas where water or contaminants can infiltrate the housing 12.

In an alternative arrangement, housing 12 is formed multiple pieces. In one arrangement, a back portion or non-transparent portion 44, connects to a front portion or transparent portion 42 along a connection point or seamline that is glued, welded, adhered or connected in any other way to one another. In this arrangement, the back portion or non-transparent portion 44 is formed of a black or dark or non-transparent material or is painted with a black or dark or non-transparent paint, whereas the front portion or transparent portion 42 is formed of a transparent or translucent material that allows light to be transmitted there through. In one arrangement, the back portion or non-transparent portion 44 is formed of the back wall 32 and the entirety of the sidewalls 34 which connect to the cover portion 36 at the outward ends of sidewalls 34. In another arrangement, the back portion or non-transparent portion 44 is formed of the back wall 32 and a portion of the sidewalls 34 which connect to the cover portion 36 which includes a portion of the sidewalls 34 and as such, sidewalls 34 connect to one another along a seamline where the back portion of the sidewalls 34 are part of the nontransparent portion 44 and the forward portion of the sidewalls 34 are part of the transparent portion 42. Any other configuration is hereby contemplated for use.

Circuit Board:

Circuit board 14 is formed of any suitable size, shape and design and is configured to house a plurality of light emitting diodes 46 ("LEDs") thereon and facilitate selective illumination of the LEDs 46. In one arrangement, as is shown, circuit board 14 is formed of a backing material 48 and a circuitry layer 50.

Backing material 48 is formed of any suitable size, shape and design and serves to provide support to circuitry layer 50 as well as serve heat dissipation purposes. In one arrangement, backing material 48 is formed of a metallic material, such as aluminum, copper, an aluminum alloy, a copper alloy, or any other metallic material, rigid material and/or material the provides for support and/or heat dissipation. In an alternative arrangement backing material 48 is formed of a non-metallic material.

Backing material 48 provides structural support for circuitry layer 50 as well as heat dissipation. That is, when circuitry layer 50 is connected to backing material 48 and backing material 48 is formed of a material with a high coefficient of diffusivity (such as aluminum, an aluminum alloy, copper, a copper alloy, or another alloy material) backing material 48 helps to absorb and diffuse heat generated by LEDs 46. To maximize space utilization within the hollow interior 40 of housing 12, backing material 48 is relatively thick, and substantially thicker than circuitry layer 50, and backing material 48 fits within the hollow interior 40 of housing 12 within relatively close and tight tolerances. In the arrangement shown, when viewed from the side, backing material 48 is generally rectangular in shape with an opposing back wall and forward wall that approximate the size of or are slightly the size of the interior surface of back wall 32 of housing 12 and are positioned in approximate parallel planar spaced relationship with one another; and similarly backing material 48 has a pair of opposing sidewalls that extend a portion of the interior surface of sidewalls 34. The width of backing material 48 is slightly smaller than the width between the interior surfaces of opposing sidewalls 34 of housing 12 so as to facilitate insertion of backing material 48 into the hollow interior 40 of housing 12. The height of backing material 48 is smaller than the height of the interior surfaces of sidewalls 34 so as to provide room for ribbon wire 63 behind backing material 48 as well as to provide room for circuitry layer 50 and LEDs 46 on top of backing material 48. Maximizing the size of backing material 48 within the hollow interior 40 of housing 12, while providing ample room for the other components of the system 10 maximizes heat diffusion and structural rigidity provided by backing material 48.

Circuitry layer 50 is formed of any suitable size shape and design and provides the electrical connection between the electrical components of the system 10. In one arrangement, circuitry layer 50 includes the electrical leads and traces that connect and interconnect the electrical components of system 10 including LEDs 46, ribbon wire 63 and control box 22. Circuitry layer 50 may be formed of multiple layers itself so as to provide electrical isolation between the many electrical leads therein.

While backing material 48 and circuitry layer 50 are described as separate components in one arrangement they may be formed as a single component, or alternatively they may be formed of separate components. That is, circuitry layer 50 may be manufactured separately and then applied to backing material 48. Alternatively, circuitry layer 50 may be formed onto and/or into backing material 48.

Circuit board 14 is formed of any suitable size shape and design and is configured to house, hold and provide the electrical connections for LEDs 46. In the arrangement shown, circuit board 14 includes three rows of densely packed LEDs 46 that extend a length or the entire length between end caps 18 within the hollow interior 40 of housing 12, including a row of amber LEDs 46A, a row of white LEDs 46W and a row of red LEDs 46R. In the arrangement shown, the white LEDs 46 are positioned in the middle with the red and amber LEDs 46 positioned on opposite sides of the row of white LEDs 46, however any other configuration is hereby contemplated for use.

To provide independent control of various portions of light bar system 10, circuit board 14 is electrically separated into a plurality of segments 16. Segments 16 allow for independent control of each segment. In the arrangement shown, light bar 10 is separated approximately down its middle at a seamline 54 into two separate segments 16, such as a driver's side segment 16 and a passenger side segment 16. Segments 16 can be independently illuminated as well as simultaneously illuminated. Separating light bar 10 into driver side and passenger side segments 16 allows the control box 22 to illuminate the entire length of light bar 10 for breaking and backing up, as well as illuminating only one segment 16 for the turning signal. While only two segments 16 are shown, any number of segments 16 are hereby contemplated for use.

To reduce the appearance of the light bar 10 when installed, the exterior facing surface 55 of circuit board 14 is a dark or black color. This dark or black color reduces the visibility of the light bar 10 when installed thereby improving the aesthetic appearance of the light bar 10.

Endcaps & Wiring:

End caps 18 are formed of any suitable size, shape and design and serve to close the hollow interior 40 of housing 12 at its outward ends. In one arrangement, one end cap 18 allows the passage of wiring 56 there through whereas the opposite end cap 18 does not have wiring 56 passing there through and as such this end cap 18 simply closes the opposite end of housing 12 from the wiring end cap 18. To continue with the low-profile appearance theme of the light bar 10, in one arrangement, end caps 18 are formed of a black material, like the back portion or non-transparent portion 44 of housing 12. End caps 18 are friction fit as well as sealed within the hollow interior 40 of housing 12 so as to prevent water and contaminants from entering hollow interior 40. End caps 18 are sealed into housing 12 by any manner, method or means such as gluing, adhering, welding, heat shrinking, taping, wrapping and/or any combination thereof or the like.

Wiring 56 is made up of an electrically conductive material such as a metal or alloy. Non-limiting examples of electrically conductive materials include, gold, gold alloys, copper, copper alloys, silver, silver alloys, nickel, nickel alloys, palladium, palladium alloys, zinc, and zinc alloys may be used. In at least one embodiment, the use of a gold alloy for wiring 56 is preferred.

Wiring 56 exiting one end of housing 12 electrically connects to control box 22 and includes a fuse 58 before electrically connecting to a plug 60. Plug 60 is formed of any suitable size, shape and design and in one arrangement is formed of a conventional four-way trailer plug that electrically connects to the electrical system of many standard vehicles 30. However any other form of plug is hereby contemplated for use as is directly wiring the wiring 56 of light bar 10 into the wiring system of vehicle 30.

In one arrangement, wiring 56 also includes one or more signal leads 62. Signal lead 62 is an electrical lead that is configured to be electrically connected to electrical system of vehicle 30, and more specifically a reverse light lead, a left turn signal lead, a right turn signal lead or another electrical lead of vehicle 30. In combination, plug 60 and signal lead(s) 62 are configured to receive power and operational signals from vehicle 30 and provide operational signals to light bar 10. That is, as a user operates vehicle 30, the lights in the back of the vehicle 30, where light bar 10 is positioned, are controlled in various ways. That is, when the user presses the brake pedal, the brake lights of the light bar 10 illuminate until the brake pedal is released; when the user engages a turn signal, the appropriate turn signal of the light bar 10 periodically flashes until the turn signal is disengaged; when the user places the vehicle 30 in reverse, the reverse lights of the light bar 10 illuminate until the vehicle 30 is removed from reverse; when the user turns the hazard lights on, the brake lights of the light bar 10 flash until the hazard lights are turned off, and so on. Signal lead 62, as well as the other wires of wiring 56, are configured to receive and transmit the operational signals to the light bar 10 so that light bar 10 can illuminate appropriately and in coordination with the lights of vehicle 30.

In the arrangement wherein the light bar 10 is formed of two segments 16, a ribbon wire 63 extends outward from an end of each segment 16. That is, a ribbon wire 63 connects to the first segment 16 and extends outward through the end cap 18 that allows passage of the ribbon wire 63 there through. A second ribbon wire 63 extends under the circuit board 14 of the first and second segment 16 and electrically connects to the end of second segment 16 opposite first segment 16. This ribbon wire 63 also extends out the same end cap 18 such that both wires extend out of the same end of housing 12. In the arrangement shown, ribbon wire 63 includes six wires, or three pairs of wires, one pair for each color of LED 46 (white LED 46W, red LED 46R, and amber LED 46A). As depth of the system 10 is important to maintain the low profile nature of the system 10, to minimize the depth of the system, only two segments 16 are used and therefore only one layer of ribbon wire 63 extends below the segments 16. Having the ribbon wire 63 extend out of the outward ends of the segments 16 allows the circuit boards 14 and backing material 48 and circuitry layer 50 connect to one another in flush alignment with one another at seamline 54 in flush and flat engagement with little to no gap there between. This allows for practically seamless illumination between opposing segments 16 and makes it practically impossible to distinguish between the opposing segments 16 as the spacing of the LEDs 46 is maintained across the seamline 54. That is, the seamline 16 does not disturb the continuous spacing of LEDs 46 from one segment 16 to the other segment 16. In fact, the seamline 54 is itself hard to see when light bar 10 is inspected.

Control Box:

System 10 includes a control box 22. Control box 22 is formed of any suitable size, shape and design and is configured to receive operational signals from the electrical system of vehicle 30, interpret these signals and output operational signals that control operation of light bar 10. Control box 22 includes a microprocessor 64 and memory 66 among other components. Microprocessor 64 is any device which receives informational signals, interprets these signals, and outputs information or commands based on instructions stored in memory 66. Memory 66 is any form of an informational storage device or system, such as RAM, flash memory, a hard drive, or the like. Information or instructions in the form of software, code, firmware or the like are stored on memory 66 and is accessible to microprocessor 64. Microprocessor 64 and memory 66 may be formed of a single unitary device, separate but electrically connected devices, or a plurality of separate but electrically connected devices.

The microprocessor 64 is programmed to instruct light emitting devices, such as LEDs 46, to emit light according to one or more selected strobing patterns. The microprocessor can be further configured to restrict the emission of light in at least one of the at least four different colors such that the manufacturer can limit the capability of the light bar 10 before sale to a consumer. This means that only a single stock-keeping unit (SKU) is necessary to create light bars which are capable of performing any specific function, and other functions not useful to the ordinary consumer (e.g. police emergency light features) are prevented either by restricting the emission of light in at least one color and/or preventing specific strobing patterns. This programming process is in explained in more detail below, under the section heading "Programming of the Microcontroller."

Since light bar 10 is configured to be installed on practically any vehicle 30, microprocessor 64 and memory 66 are programmed to interpret signals from multiple types of vehicles and output the appropriate operational signals. That is, in one arrangement, microprocessor 64 and memory 66 are programmed to detect or determine what type of vehicle they are connected to and then determine the appropriate operational signal to output based on what operational signals are received as input. In this way, the use of control box 22 and microprocessor 64 and memory 66 allows for seamless utilization of a single light bar 10 for multiple makes and models of vehicle 30 without the need to program or reprogram the microprocessor 64 and memory 66 for each vehicle 30. This increases the speed and ease of installation and use.

Figure 9A:
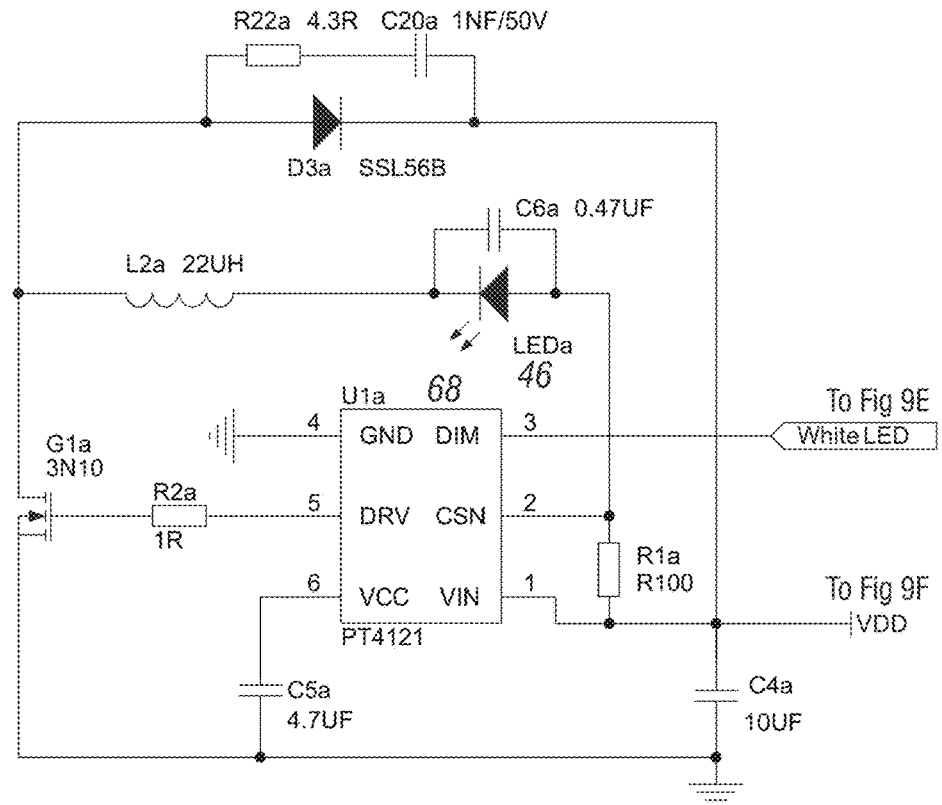
FIGS. 9A-G show detailed electrical schematic views of the light bar system of FIG. 2, the views showing the exemplary electrical components and logic used for automatically overriding the continuous interpretation of signals directly received from the electrical system of the vehicle with a manual instruction and resulting pattern caused by illuminating the LEDs at specific times, according to some aspects of the present disclosure.
Figure 9B:
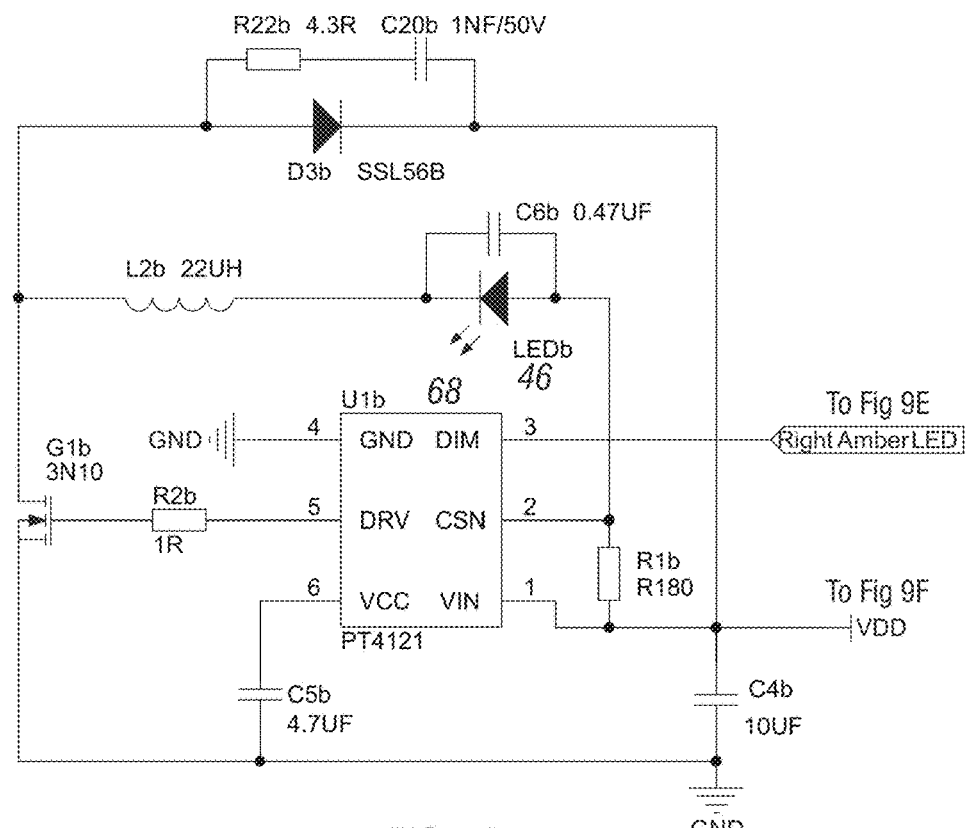
Figure 9C:
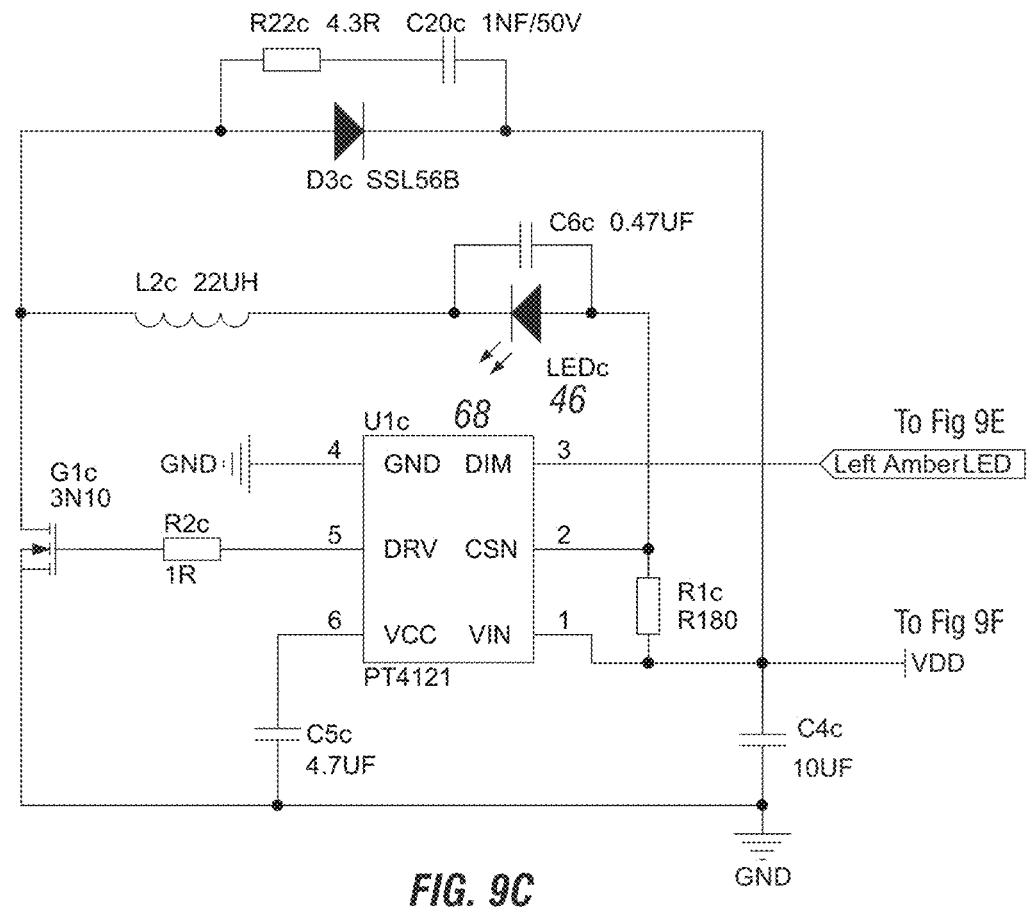
Figure 9D:
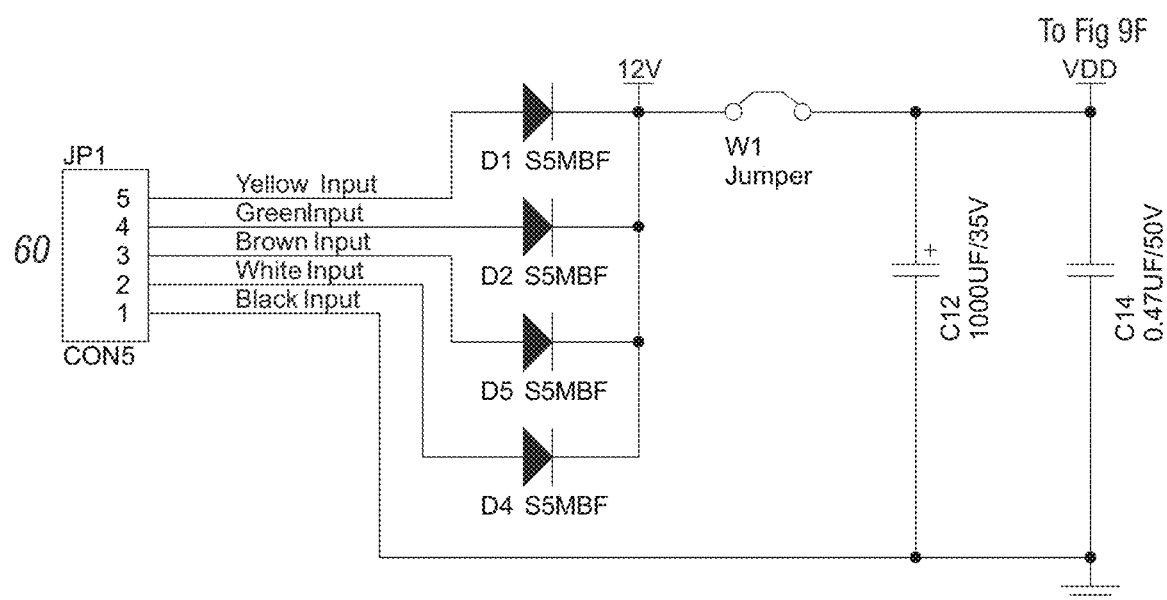
Figure 9E:
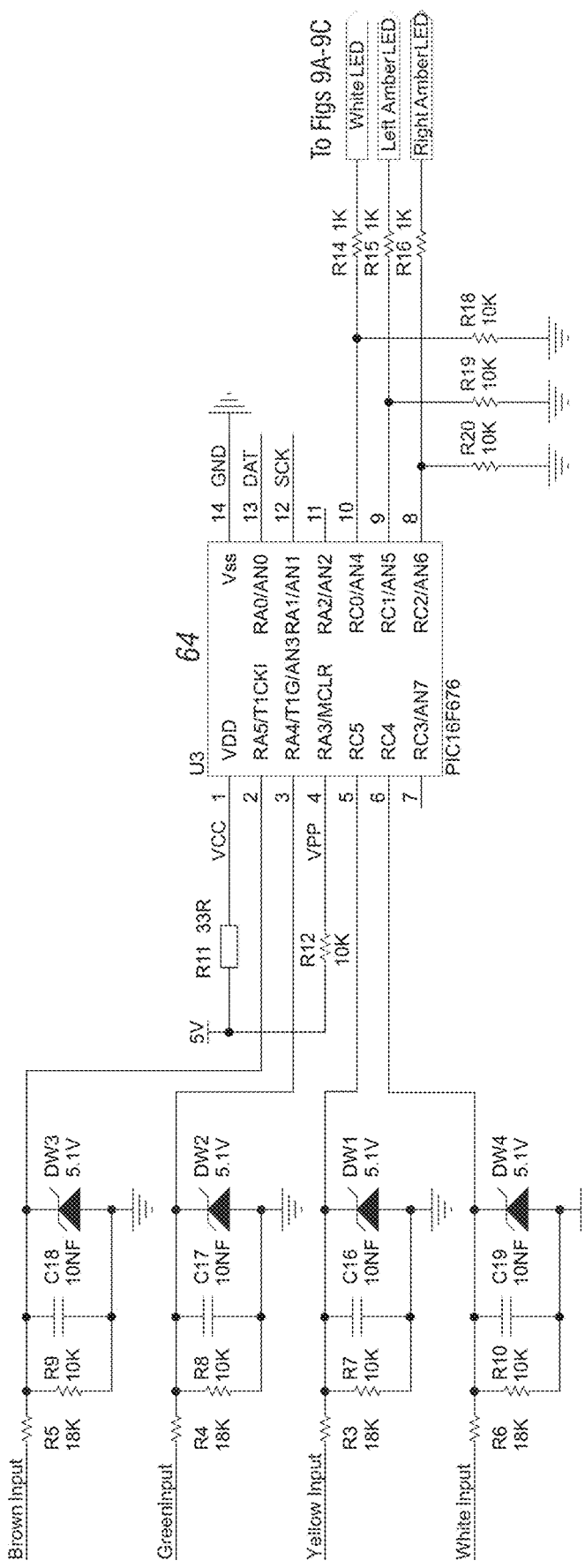

The microprocessor 64 shown in FIG. 9E may also be programmed to override the automatic interpretation of signals and illumination of the independently controllable segments of the vehicle light bar in the event a manual instruction is sent by an operator with a strobing pattern. The microprocessor 64 for example may be a PIC16F676. In some embodiments, the microprocessor 64 may be a 14 pin, flash-based 8-bit CMOS microcontroller and may include a high-performance reduced instruction set computer (RISC) CPU. The RISC CPU has only 35 instructions to learn, all of which are single-cycle except branches; an operating speed associated with a 20 MHz oscillator/clock input and a 200 ns instruction cycle; an interrupt capability; an 8-level deep hardware stack; a direct, indirect, and relative addressing modes. The microprocessor 64 features internal and external oscillator options, with a precision internal 4 MHz oscillator factory calibrated to +/−1%, an external oscillator support for crystals and resonators, and a 5 µs wake-up from sleep, 3.0V, typical; a power-saving sleep mode; a wide operating voltage range −2.0V to 5.5V; an industrial and extended temperature range; a low-power power-on reset (POR); a power-up timer (PWRT) and oscillator start-up timer (OST); a brown-out detect (BOD); a watchdog timer (WDT) with independent oscillator for reliable operation; a multiplexed MCLR/input-pin; an interrupt-on-pin change; an individual programmable weak pull-ups; and a programmable code protection; a high endurance flash/EEPROM cell with a 100,000 write flash endurance, a 1,000,000 write EEPROM endurance, and a flash/data EEPROM retention greater than 40 years. The microprocessor 64 may have several low-power features including a standby current of 1 nA at 2.0V, typical; an operating current of 8.5 µA at 32 kHz, 2.0V, typical or 100 µA at 1 mHz, 2.0V, typical; a watchdog timer current of 300 nA at 2.0V, typical; and a timer 1 oscillator current of 4 µA at 32 kHz, 2.0V, typical. The microprocessor 64 may also peripherally feature 12 I/O pins with individual direction control, high current sink/source for direct LED drive, an analog comparator module with one analog comparator, a programmable on-chip comparator voltage reference (CVREF) module, a programmable input multiplexing from device inputs, and a comparator output that is externally accessible; an analog-to-digital converter module with a 10-bit resolution, a programmable 8-channel input, and a voltage reference input; an enhanced timer with a 16-bit timer/counter with a prescaler, an external gate input mode, and an option to use OSC1 and OSC2 in LP mode as a timer oscillator, if INTOSC mode is selected; and in-circuit serial programming via two pins.

Figure 11:
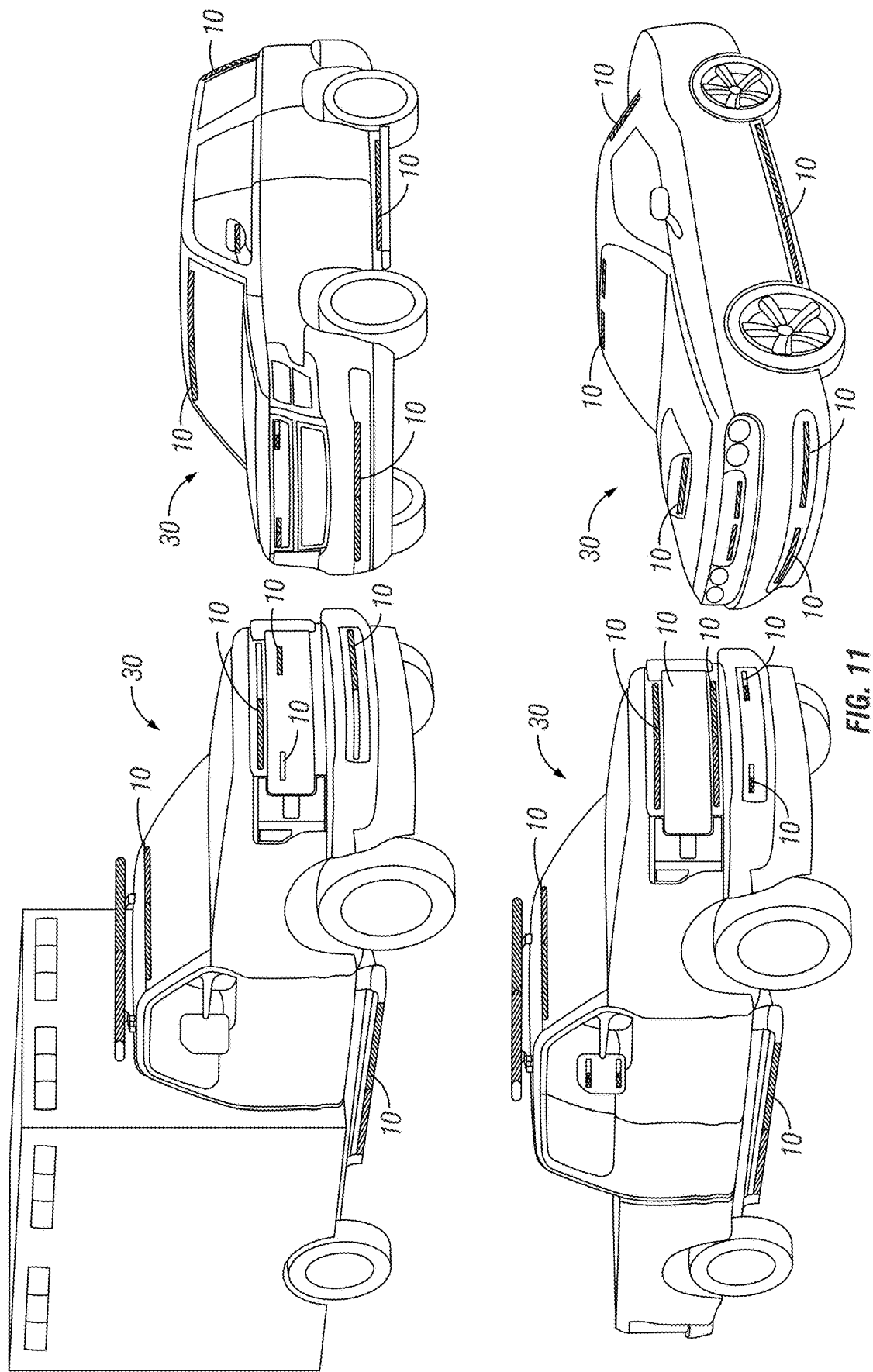
FIG. 11 shows exemplary vehicles which may have use for an emergency light bar, including a police car, a security vehicle, a fire truck, and an ambulance, according to some aspects of the present disclosure.
Figure 12:
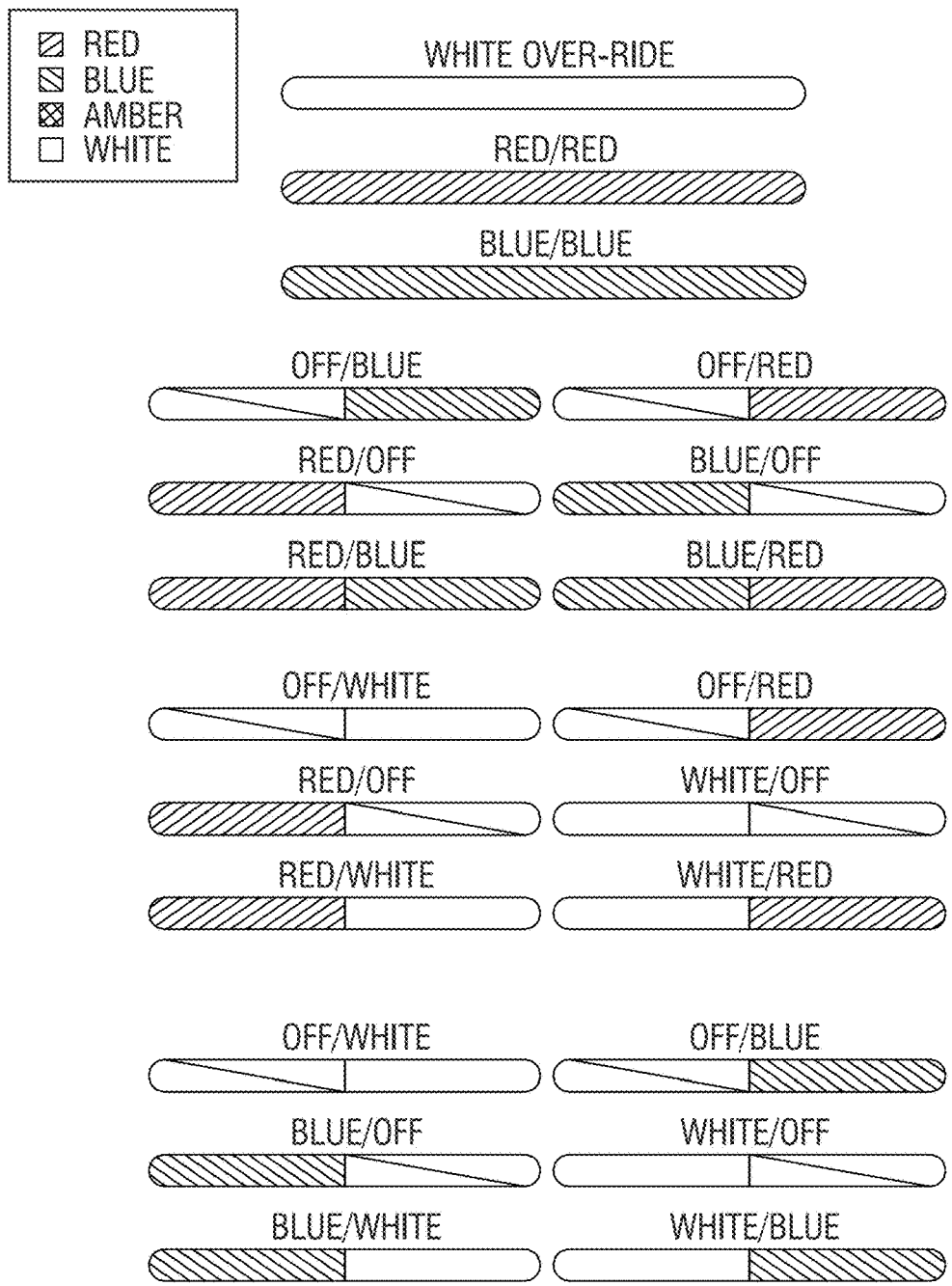
FIG. 12 shows possible color combinations and strobing patterns associated with an emergency light bar, according to some aspects of the present disclosure.
Figure 13:
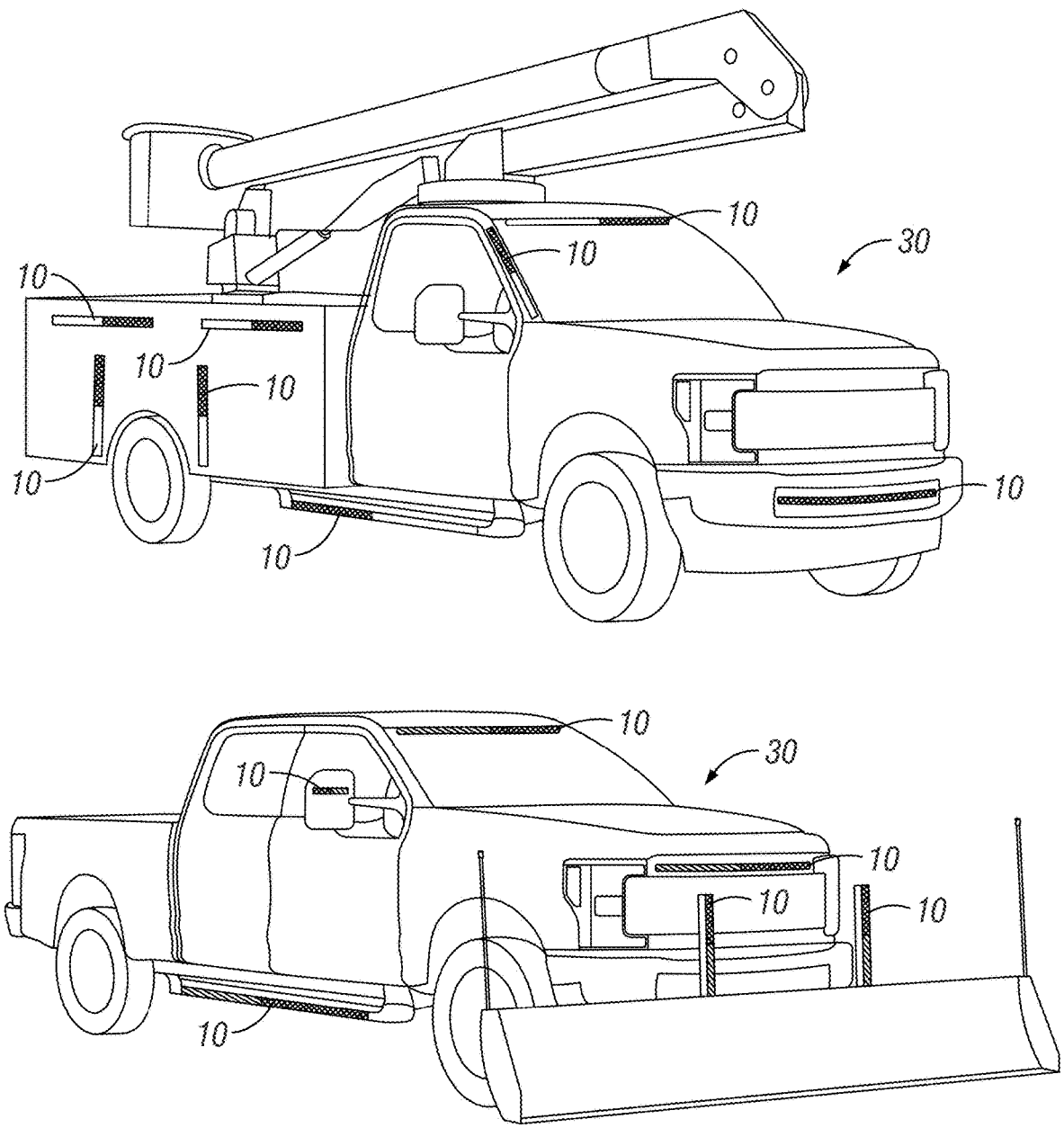
FIG. 13 shows exemplary vehicles which may have use for an emergency light bar, including a pickup truck and a construction vehicle including a boom, according to some aspects of the present disclosure.

The strobing pattern may be selected from the group consisting of an emergency strobing pattern and a work light strobing pattern, as shown in FIGS. 12 and 14. The strobing patterns may be employed on light bars 10 utilized with the exemplary vehicles shown in FIGS. 10 and 11.

For an emergency light bar, the light bar 10 may be segmented into two independently controllable light segments that have red, white, and blue LEDs. The light bar 10 may achieve any of the possible color combinations shown in FIG. 12. For example, the left independently controllable light bar segment may be red and the right independently controllable light bar segment may be blue, the left independently controllable light bar segment may be white and the right independently controllable light bar segment may be off, or any other combination of red, blue, white, and off.

For a work or construction light bar, the light bar 10 may be segmented into two independently controllable light segments that have amber, white, and blue LEDs. The light bar 10 may achieve any of the possible color combinations shown in FIG. 14. For example, the left independently controllable light bar segment may be amber and the right independently controllable light bar segment may be blue, the left independently controllable light bar segment may be white and the right independently controllable light bar segment may be off, or any other combination of amber, blue, white, and off.

Other color combinations and purposes for using the light bar 10 not expressly disclosed herein are still contemplated by the present invention. Other examples of non-limiting colors of LEDs could include green, purple, yellow, silver, etc. and other non-limiting examples of purposes could include customizing the look of vehicles, administering funerals, etc.

Figure 10:
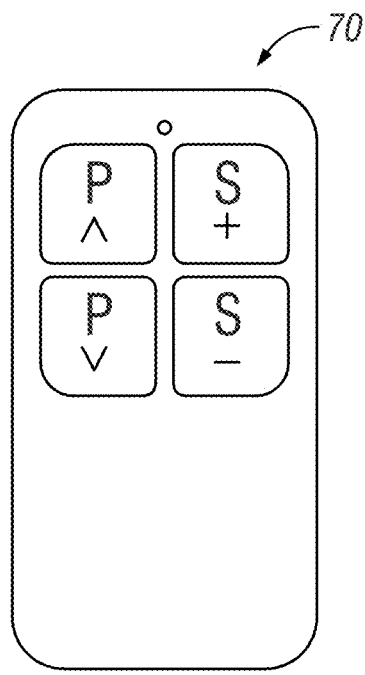
FIG. 10 shows an elevation view of a wireless remote capable of sending a manual instruction or signal which corresponds with a specific lighting pattern for the light bar shown in FIG. 2, according to some aspects of the present disclosure.

The lights in FIGS. 11-14 may strobe by turning off for one pulse and then turning back on; by pulsing in triplets; or by an operator manually pulsing the lights, potentially via the use of a remote control, such as the remote control 70 in FIG. 10. Such a remote control may be wireless and may allow an operator to manually choose the timing, color, and brightness of a pulse by sending an instruction to the microprocessor 64 to perform a specific strobing pattern.

The manual instruction may also be created by switches, buttons, or dials that are directly or operationally attached to the control box 22. Still in other embodiments, the manual instruction could be controlled by depressing the pedals, using turn signals, etc. In other words, the manual instruction could be used to override the normal operational lights of the vehicle or the normal operational lights of the vehicle could override a specific strobing pattern, such as an emergency or work light strobing pattern. The different pulsing and color combinations result in at least sixty-four separate strobe operations in addition to a completely white override and the ability to manually pulse the lights.

Electrical Components of the Control Box and the Circuit Board:

As shown in FIGS. 9A-9C, the portion of the circuit board 14 and control box 22 associated with each individual LED 46 (e.g., a white LED in FIG. 9A, a right amber LED in FIG. 9B, and a left amber LED in FIG. 9C) include any necessary logic and electrical components for automatically receiving signals from the electrical system of the vehicle, interpreting the signals received from the electrical system of the vehicle, and in response automatically controlling illumination of independently controllable segments of the vehicle light bar.

For example, the electrical components and logic within the system may be provided and preferably arranged according to the views presented. The system uses several resistors to reduce current flow, adjust signal levels, to divide voltages, bias active elements, and terminate transmission lines, among other things; several capacitors to store energy, to smooth the output of the power supply, and for blocking direct current while allowing alternating current to pass; several inductors for block alternating current while allowing direct current to pass and for separating signals of different frequencies; and several diodes for allowing an electric current to pass in one direction and to convert alternating current to direct current.

Of particular importance in FIGS. 9A-9C is the placement of the LEDs 46 and the high-efficiency step-down controller 68. The high-efficiency step-down controller 68 is designed to operate in continuous conduction mode and drive single or multiple series connected LEDs 46 efficiently from a voltage source higher than the total LED chain voltage. For example, the high-efficiency step-down controller 68 may be a PT4121 may provide an externally adjustable output current. In some embodiments, the high-efficiency step-down controller 68 includes a high-side output current sense circuit, which uses an external resistor to set the nominal average output current, and a dedicated DIM input accepts either a DC voltage or PWM dimming. The high-efficiency step-down controller 68 features a simple low parts count, a high efficiency up to 97%, single pin on/off and brightness control using DC voltage or PWM, up to 1 MHz switching frequency, adjustable constant LED current, typical 3% output current accuracy, a high-side current sense, a hysteretic control, an inherent $R_{CS}$ open protection, an inherent open-circuit LED protection, an inherent short-circuit LED protection, and a thermal shutdown. The high-efficiency step-down controller 68 may be used in low voltage halogen replacement LEDs, automotive or decorative lighting, low voltage industrial lighting, as LED backup lighting, as signs/emergency lighting, etc. The recommended operating range for the high-efficiency step-down controller 68 includes temperatures ranging from negative forty degrees Celsius to eighty-five degrees Celsius and a supply wide input voltage from 6V to 60V. Exceeding these ranges may damage the device or cause the device to cease functioning. When the device operates at high ambient temperature, or when driving maximum load current, care must be taken to avoid exceeding the package power dissipation limits.

In some embodiments, the high-efficiency step-down controller 68, in conjunction with a current sense resistor ($R_{CS}$), an inductor ($L_1$), and a MOSFET, forms a self-oscillating continuous-mode buck converter. When the input voltage (VIN) is first applied, the initial current in the inductor and the current sense resistor is zero and there is no output from the current sense circuit. Under this condition, the output of a current sensing comparator is high. This turns on switch, causing current to flow from the input voltage to ground, via the current sense resistor, the LEDs 46, the inductor, and the external MOSFET. The current rises at a rate determined by the input voltage and the inductor to produce a voltage ramp (VSCN) across the current sense resistor. When the difference between the input voltage and the voltage ramp is greater than 230 mV, the output of the current sensing comparator switches low and the switch turns off. The current flowing on the current sense resistor decreases at another rate. When the difference between the input voltage and the voltage ramp is less than 170 mV, the switch turns on again and the mean current on the LED 46 is determined by 200 mV per each current sense resistor. The high-side current-sensing scheme and on-board current-setting circuitry minimize the number of external components while delivering LED current with ±3% accuracy, using a 1% sense resistor. The high-efficiency step-down controller 68 allows dimming with a PWM signal at the DIM input. A logic level below 0.3V at DIM forces the high-efficiency step-down controller 68 to turn off the LED 46 and the logic level at DIM must be at least 2.5V to turn on the full LED current. The frequency of PWM dimming ranges from 100 Hz to 20 kHz. The DIM pin can be driven by an external DC voltage ($V_{DIM}$) to adjust the output current to a value below the nominal average value defined by the current sense resistor. The DC voltage is valid from 0.5V to 2.5V. When the DC voltage is higher than 2.5V, the output current keeps constant. Additionally, to ensure the reliability, the high-efficiency step-down controller 68 is built with a thermal shutdown (TSD) protection. The thermal shutdown protects the integrated circuit from over temperature (above one hundred-fifty degrees Celsius).

As shown in FIGS. 9A-9C, the high-efficiency step-down controller 68 as shown includes the following pins: 1 VIN, an input power supply pin connected to a decoupling capacitor from VIN pin the ground; 2 CSN, an LED current sense input connected to a current-sense resistor that programs LED average current to the VIN pin; 3 DIM, a logic level dimming input driving the DIM pin low to turn off the current regulator and driving the DIM pin high to enable the current regulator; 4 GND, the signal and power ground connected directly to a ground plane; 5 DRV, a gate-driver output connected to the gate of the external MOSFET; and 6 VCC, an internal regulator output connected to a 1 µF decoupling cap from the VCC pin to the ground. In still other embodiments (not shown), the high-efficiency step-down controller 68 may include two or more pins that are not initially connected to anything for further versatility.

The nominal average output current in the LEDs 46 is determined by the value of the external current sense resistor connected between VIN and CSN and is given by $I_{OUT}/R_{CS}$. This equation is valid when DIM pin is float or applied with a voltage higher than 2.5V (must be less than 5V). Actually, the current sense resistor sets the maximum average current which can be adjusted to a less one by dimming.

The DIM pin can be driven by an external DC voltage ($V_{DIM}$), to adjust the output current to a value below the nominal average value defined by the current sense resistor. The average output current is given by $$I_{OUT} = \frac{0.2 \times V_{DIM}}{2.5 \times R_{CS}} (0.5 \text{ V} \le V_{DIM} \le 2.5 \text{ V}).$$

100% brightness corresponds to $2.5V \le V_{DIM} \le 5V$.

A pulse with modulated (PWM) signal with duty cycle PWM can be applied to the DIM pin, to adjust the output current to a value below the nominal average value set by the current sense resistor. PWM dimming provides reduced brightness by modulating the LEDs 46 forward current between 0% and 100%. The LED brightness is controlled by adjusting the relative ratios of the on time to the off time. A 25% brightness level is achieved by turning the LED on at full current for 25% of one cycle. To ensure this switching process between on and off state is invisible by human eyes, the switching frequency must be greater than 100 Hz, the human eyes average the on and off times, seeing only an effective brightness that is proportional to the LEDs on-time duty cycle. The advantage PWM dimming is that the forward current is always constant, therefore the LED color does not vary with brightness as it does with analog dimming. Pulsing the current provides precise brightness control while preserving the color purity the dimming frequency of the high-efficiency step-down controller 68 can be as high as 20 kHz.

An external capacitor from the DIM pin to ground will provide additional soft-start delay, by increasing the time taken or the voltage on this pin to rise to the turn-on threshold and by slowing down th rate of rise of the control voltage at the input of the comparator.

A low equivalent series resistance (ESR) capacitor should be used for input decoupling, as the ESR of this capacitor appears in series with the supply source impedance and lowers overall efficiency. This capacitor has to supply the relatively high peak current to the coil and smooth the current ripple on the input supply. A minimum value of 10 µF is acceptable if the DC input source is close to the device, but higher values will improve performance at lower input voltages, especially when the source impedance is high. The voltage rating should be greater than the input voltage. The input capacitor should be placed as close as possible to the integrated circuit. For maximum stability over temperature and voltage, capacitors with X7R, X5R, or better dielectric are recommended. Capacitors with &5V dielectric are not suitable for decoupling in this application and should not be used.

Lower value of inductance can result in a higher switching frequency, which causes a larger switching loss. Choose a switch frequency between 100 kHz to 500 kHz for most applications. According to switching frequency, inductor value can be estimated as:

$$L = \frac{\left(1 - \frac{V_{OUT}}{V_{IN}}\right) \times V_{OUT}}{0.3 \times I_{LED} \times f_{SW}}$$

For higher efficiency, choose an inductor with a DC resistance as small as possible.

For most applications, the output capacitor is not necessary. Peak to peak ripple current in the LEDs 46 can be reduced below 30% of the average current, if required, by adding a capacitor across the LEDs 46. A value of 2.2 µF will meet most requirements. Proportionally lower ripple can be achieved with higher capacitor values. Note that the capacitor will not affect operating frequency or efficiency, but it will increase start-up delay and reduce the frequency of dimming, by reducing the rate of rise of LED voltage.

The current sense resistor should be placed close to the VIN pin and CSN pin in order to minimize current sense error. The input loop including input capacitor, Schottky diode, and MOSFET which should be as short as possible.

Clip:

Clip 28 is formed of any suitable size, shape and design and is configured to connect housing 12 to vehicle 30. In one arrangement, as is shown, clip 28 has a back wall 100 that extends between opposing end walls 102 and opposing sidewalls 104. Back wall 100 has a generally flat forward face 106 and a generally flat rearward face 108 that form planes that extend in approximate parallel spaced relation to one another. Opposing sidewalls 104 extend in approximate parallel spaced relation to one another and opposing end walls 102 extend in approximate parallel spaced relation to one another. As such, sidewalls 104 and end walls 102 extend in approximate perpendicular alignment to one another thereby forming a generally rectangular member.

A pair of opposing arms 110 are connected to each end of clip 28. Arms 110 are connected to sidewalls 104 and extend upward a distance from forward face 106. The outward edge of arm 110 is in planar alignment with sidewall 104. The outward end of arm 110 is in alignment with end wall 102 and extends inward a distance therefrom. Arms 110 include a locking feature 112 positioned at their outward most end. Locking features 112 are formed of any suitable size, shape and design and are designed to engage and lock housing 12 into clip 28. In one arrangement, locking features 112 are formed of a step or ledge or hook that matingly engage the feature 38 or step in the exterior surface of housing 12 positioned at the intersection of cover portion 36 and sidewalls 34. In the arrangement shown, when clip 28 is viewed from the and end 102, locking features 112 on opposing arms 110 extend inward and over the forward face of back wall 100 a distance. Accordingly, to facilitate locking engagement, arms 110 extend upward from forward face 106 approximately the same distance as sidewall 34 of housing 12.

To further facilitate a firm, durable and strong connection between clip 28 and housing 12, arms 110 are slightly biased inward toward one another. This causes the distance between the outward ends of arms 110 to be slightly narrower than the width of housing 12. As such, when housing 12 is placed between opposing arms 110 and locked into place an inward force is applied on housing 12 by arms 110. This helps to hold housing 12 within clip 28. This also helps to keep engagement between locking feature 112 of arm 110 and the feature 38 of housing 12.

Due to the slight inward bias of the arms 110 of clip 28, the outward most ends of arms 110 include a curved or angled guiding surface 114. Guiding surface 114 helps to guide the housing 12 into the space between opposing arms 110. In the arrangement shown, guiding surface 114 curves or angles inward from the upper most end of arms 110 down to the step of locking feature 112. This causes the upper ends of guiding surface 114 to be wider than the width of back wall 32 of housing 12, while the lower end of guiding surface 114 is narrower than the width of back wall 32 of housing 12. This causes the arms 110 to flex or bend outward as the light bar 10 is forced within the clip 28.

The rearward face 108 of back wall 100 is flat and thereby provides maximum surface area for connection to the body of vehicle 30. This allows for the use of an adhesive, such as a double sided tape or foam or gel to be positioned between the rearward face 108 of clip 28 and the body of vehicle 30. Using adhesive eliminates the need to put screws or bolts into the body of vehicle 30, simplifies the installation process, speeds the installation process, eliminates the need to use tools to install the clips 28 and provides a durable installation.

Despite that the installation process that uses adhesives instead of drilling and screwing, back wall 100 includes an opening 116 therein that facilitates reception of a screw or other fastening device therein if the installer chooses to use a fastener. In one arrangement, to ensure the head of the screw does not protrude, the opening 116 is countersunk. That is, the walls of the opening angle inward as they extend from forward face 106 to rearward face 108.

Installation and Use:

The system 10 is installed by first placing adhesive on the rearward face 108 of a plurality of clips 28. In one arrangement, the clips 28 are then adhered to the body of vehicle 30. Once the clips 28 are installed on the vehicle 30, the housing 12 is aligned with the clips 28 and the housing 12 is forced into the clips 28. Alternatively, the clips 28 are installed onto the housing 12 and then the housing 12 and clips 28 are simultaneously installed onto the body of the vehicle 30.

When the housing 12 is forced into the clips 28, the back wall 32 of housing 12 engages the upper or outward end of the guiding surface 114 of arms 110 of clips 28. As the guiding surfaces 114 angle inward and because the arms 110 are angled slightly inward, force is applied causing the arms 110 to elastically bend outward as the housing 12 is forced downward between opposing arms 110. The arms 110 continue to bend outward until the ledge or step of features 112 of clip 28 passes or engages the step or features 38 of housing 12. At this point the locking features 112 of arms 110 engage or lock onto the step or features 38 of housing 12 thereby locking the housing 12 within the clip 28 with a strong and durable connection. In this position, the flat back wall 32 of housing 12 is in flat and flush engagement with the forward face 106 of the flat back wall 100 of clip 28. In this position, the exterior surface of sidewalls 34 of housing 12 are in flat and flush engagement with the interior faces of arms 110 of clip 28. In this position, the lower surface of features 112 in the end of arms 110 are in flat and flush locking engagement with the upper surface of the features 38 of the housing 12.

Figure 2:
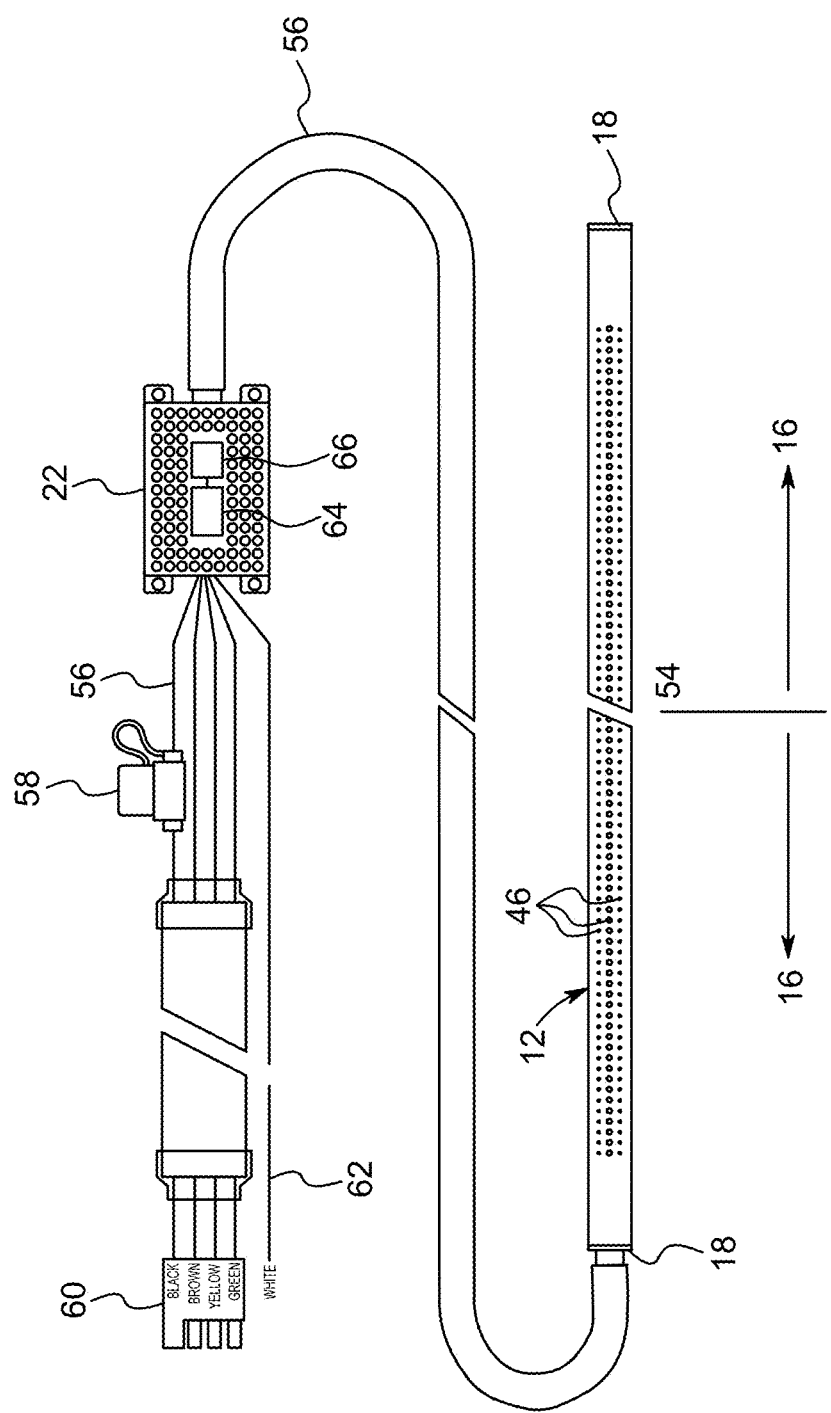
FIG. 2 is an elevation schematic view of the light bar system, the view showing the light bar having three rows of LEDs, the view showing the wiring system connected to the light bar, the view showing the control box connected to the wiring system, the view showing the fuse and plug, and electrical leads connected to the light bar that are configured to connect to the electrical system of the vehicle to which the light bar is attached, according to some aspects of the present disclosure.
Figure 9F:
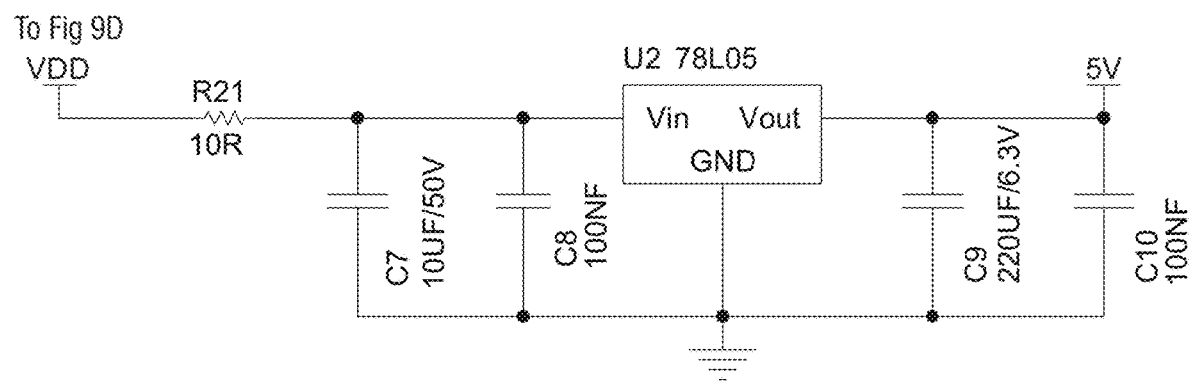
Figure 9G:
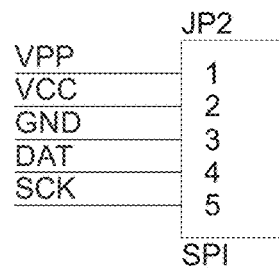

Once the housing 12 is installed, the plug 60 and signal lead 62 are connected to the electrical system of the vehicle 30, as shown in FIGS. 2 and 9D-E. Once electrically connected, the control box 22 and microprocessor 64 and memory 66 receive power and operational signals from the electrical system of the vehicle 30. Power may be delivered from the electrical system via the power supply shown in FIG. 9F. The microprocessor 64 interprets these signals according to the instructions stored in memory 66 and outputs operational signals that control operation of the light bar 10.

Dimensions:

In one arrangement, to ensure that the system 10 fits practically every commercially available pickup truck, the light bar system 10 comes in two lengths, 60 inches or 48 inches. The use of these two lengths facilitates use on practically all commercially available pickup trucks. Any other length is hereby contemplated for use. The light bar has a depth approximately ⅜ of an inch without the clip 28 and approximately ½ of an inch with the clip 28 installed. The light bar 10 has a height of approximately ⅝ of an inch without the clip 28 and ¾ of an inch with the clip 28 installed. In one arrangement, the clips 28 are approximately 3 and ¼ inches long. Any other depth and/or width is hereby contemplated for use.

Method of Manufacture:

In one arrangement, the system 10 is manufactured in the following manner.

The housing 12 is extruded of a clear plastic material and the back wall 32 and the rear portions of the sidewalls 34 (nontransparent portion 44) are painted with a dark or black color. Alternatively, the housing 12 is extruded and the nontransparent portion 44 is extruded of a nontransparent material whereas the transparent portion 42 is extruded of a transparent material.

Next, the circuit board 14 is formed in segments 16. This is accomplished by installing the LEDs 46 onto the circuitry layer 50 and then installing the LEDs 46 and circuitry layer 50 on the backing material 48. Once the LEDs 46 are installed onto the circuit board 14 a first layer 120 of encapsulant 20 is laid over the LEDs 46 and the exterior facing surface 55 of circuit board 14.

Encapsulant 20 is formed of any flowable material that seals the LEDs 46 and circuit board 14. In one arrangement, encapsulant 20 is a flowable material when initially applied that later cures to a non-flowable material. In one arrangement, encapsulant 20 is a flowable plastic material that is transparent or translucent. In one arrangement, while the encapsulant 20 is initially flowable, it hardens to a rigid, semi-rigid, flexible or rubber-like material.

Next, the separate segments 16 are connected together by aligning the adjacent segments 16 in end-to-end engagement thereby forming seamline 54 there between and then an adhesive is laid over the rearward face of the circuit board 14, such as a glue, paste, tape, double sided tape or the like. This using an adhesive such as a double sided tape, gel or the like holds the two segments 16 together while also provides for adhesion of ribbon wire 63 to the back of circuit board 14 as well.

Since both segments 16 have ribbon wire 63 extending outward from an end of the segment 16, and it is desirable to have wires only coming out one end of the housing 12, the ribbon wire 63 of one segment 16 is folded around and onto the back of circuit board 14 such that both ribbon wires 63 extend out of the same end of system 10. In this position, the adhesive holds the folded ribbon wire 63 in place on the back of circuit board 14.

Now that both ribbon wires 63 extend outward from the same end of circuit board 14, the combined and assembled circuit board 14 formed of both segments 16 is slid into the hollow interior 40 of housing 12 through an open end of the housing 12 until the assembled circuit board 14 is fully installed within the hollow interior 40 of housing 12.

Once fully installed, an end cap 18 is positioned over each end. Once installed, the end caps 18 are sealed in place.

Next, to fully encapsulate the housing 12, the housing 12 is vertically aligned, so as to help the bubbles flow out of the hollow interior 40 of the housing 12 and a second layer 122 of encapsulant 20 is injected through the lower end cap 18 and into the remaining air-space within the hollow interior 40 of housing 12. This encapsulant 20 fills most if not all of the voids and spaces within the hollow interior 40 thereby providing an additional contaminant and water proofing barrier. In one arrangement, this second layer 122 of encapsulant 20 is over-flowed, that is more encapsulant 20 is forced into the hollow interior 40 of the housing 12 such that the excess escapes out the opposite end of the housing 12 and in doing so, excess air bubbles are forced out of the hollow interior 40. The encapsulant 20 is left to cure over time. Once cured the light bar 10 is ready for use.

When encapsulant 20 is properly injected within the hollow interior 40 of housing 12, the second layer 122 of encapsulant 20 fills all of the air space left within the hollow interior 40 of housing 12. In one arrangement, the second layer 122 surrounds all portions of the circuit board 14 and engages the entire exterior surface of the circuit board 14 as well as engages the entire interior surface of the hollow interior 40 of housing 12. By filling all of the air space within the hollow interior 40 of housing 12 after the circuit board 14 has been inserted within the hollow interior 40 this prevents any water or contamination from getting into the hollow interior 40 by filling this space already. In addition, even if water or contaminants did get into the hollow interior 40 of housing 12 this water and/or contaminants would not be able to get to the circuit board 14 itself as the circuit board 14 is fully encapsulated within the second layer 122 of encapsulant 20. In addition, the LEDs 46 are also encapsulated by the first layer 120 or encapsulant 20 thereby providing a second layer of protection. This these first and second layers 120, 122 of encapsulant 20 are protected by being housed within the sealed housing 12 thereby protecting the encapsulant 20 from exposure to water and contaminants not to mention physical contact and abuse. By forming the housing 12 out of a single continuous extrusion, this prevents water or contaminants from getting into housing 12 except for the ends which are covered by end caps 18 that are sealed in place and then sealed again with second layer 122 of encapsulant 20. In way, a light bar system 10 is provided that is extremely durable and practically impenetrable.

Surface-Mount Technology (SMT):

SMT is a method for producing electronic circuits in which the components are mounted or placed directly onto the surface of printed circuit boards (PCBs). An electronic device so made is called a surface-mount device (SMD). SMT improves upon through-hole technology, a construction of fitting components with wire leads into holes in the circuit board. Namely, by using SMT, the production process speeds up. However, the risk of defects also increases due to component miniaturization and to the denser packing of boards. Thus, it can be essential to detect failure during any SMT manufacturing process.

SMT components are typically smaller than through-hole components because SMT components require smaller leads or even no leads at all. SMT components may have short pins or leads of various styles, flat contacts, a matrix of solder balls (BGAs), or terminations on the body of the component.

Where SMT components are to be placed, the circuit board 14 has flat, usually tin-lead, silver, or gold plated copper pads without holes, called solder pads. A sticky mixture of flux and tiny solder particles, i.e. solder paste, is applied to all the solder pads with a stainless steel or nickel stencil using a screen-printing process or by a jet-printing mechanism. SMT components are placed on the circuit board 14 and then conveyed into a reflow soldering oven. The SMT components first enter a pre-heat zone, where the temperature of the board and all the components is gradually, uniformly raised. The circuit board 14 then enters a zone where the temperature is high enough to melt the solder particles in the solder paste, bonding the component leads to the solder pads on the circuit board. The surface tension of the molten solder helps keep the SMT components in place, and if the solder pad geometries are correctly designed, surface tension automatically aligns the SMT components on their solder pads.

Reflowing soldering may be accomplished via infrared reflow, hot gas convection, vapor phase reflow, etc. Following reflow soldering, irregular or heat-sensitive SMT components can be installed and soldered by hand, or in large-scale automation, by focused infrared beam (FIB) or localized convection equipment.

If the circuit board 14 is double-sided, the printing, placement, and reflow steps can be repeated using either solder paste or glue to hold the components in place. If a wave soldering process is used, parts must be glued to the board prior to processing to prevent the parts from floating off when the solder paste holding them in place is melted.

Figure 19:
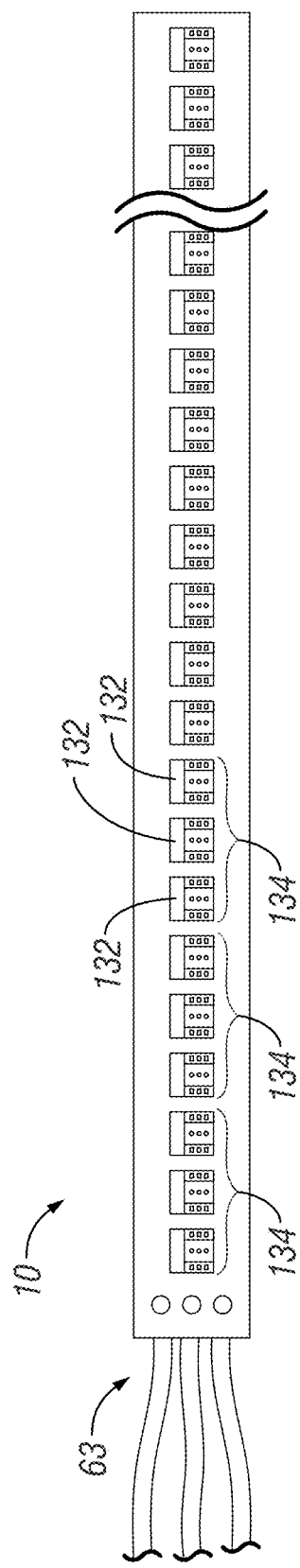
FIG. 19 is a perspective view of a vehicle light bar which incorporates LEDs mounted to a circuit board using surface-mount technology (SMT), according to some aspects of the present disclosure.
Figure 20:
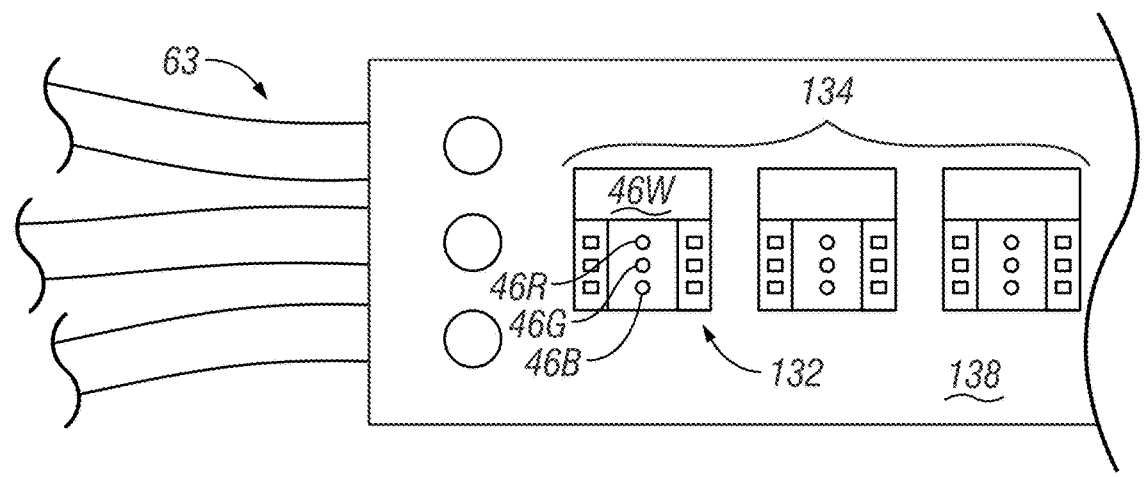
FIG. 20 is a detailed, schematic view of a first side of the circuit board, said detailed view showing one grouping of SMD assemblies with LEDs capable of illumination in several different colors, according to some aspects of the present disclosure.
Figure 21:
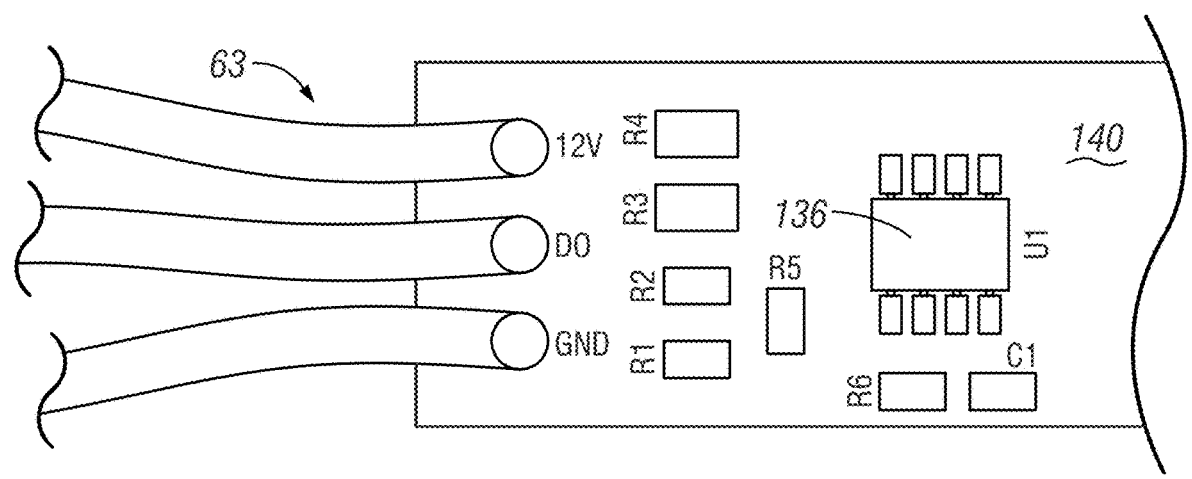
FIG. 21 shows a detailed, schematic view of a second side of the same. More particularly, the rear view reveals the microprocessor, resistors, and capacitor associated with the grouping, according to some aspects of the present disclosure.

As shown in FIGS. 19-21, the LEDs 46 can be mounted to a first surface 138 of the circuit board 14 using SMT. More particularly, several SMD assemblies 132 each having several LEDs 46 form groupings 134 which are controlled by separate microprocessors 136. The microprocessors 136 are mounted to a second surface 140 of the circuit board 14 opposite the first surface 138. Each LED 46 (e.g. a blue LED 46B, a red LED 46R, a green LED 46G, and a white LED 46W, etc.) has at least one corresponding resistor (e.g., R1-R6) on the second surface 140 of the circuit board 14. Also located on the second surface 140 of the circuit board is a capacitor C1.

Each of the LEDs 46 are independently controllable in that each LED 46 may be turned on or off regardless of whether other LEDs 46 are turned on or off and the intensity of each light can be independently varied. With such a configuration, it is advantageous to use green, red, and blue LEDs 46, given that these are the colors of an additive color model (i.e. the RGB color model) in which red, green and blue light are added together in various ways to reproduce a broad array of colors. For example, purple light may be created by turning on both the red LED 46R and the blue LED 46B. The purple light could be made to appear redder to the human eye by brightening the red LED 46R or by dimming the blue LED 46B. A software application usable in combination with a non-transitory computer readable medium, such as a mobile phone, can include a user interface that displays said a color wheel consistent with said RGB color model such that the user can simply select on the color wheel the desired color to be illuminated. The non-transitory computer readable medium can include input means, such as a touchscreen, for inputting commands to instruct each of the microprocessors 136 to brighten or dim said LEDs 46.

Chip-On-Board LEDs:

In one arrangement, LEDs 46 are what are known as Chip-On-Board (COB) LEDs. COB LED technology describes the mounting of a bare LED chip in direct contact with the substrate to produce LED arrays, which can allow for a much higher packing density. This results in higher intensity & greater uniformity of light for the user.

COB light source can save about 30% cost in the application, mainly lie in LED package cost, light engine production costs and the secondary light distribution costs, which is of great significance for many applications. In performance, through the rational design and micro-lens molding, a COB light module can avoid the defects of point and glare light and other deficiencies of prior art LEDs. COB modules make the production of lighting simpler and more-convenient, and reduce costs effectively. In production, existing technology and equipment can support high yield and large-scale COB module manufacturing, assembly and installation. As such, the use of COB LEDs provides many advantages including brighter illumination and an appearance of a single continuous light instead of a plurality of individual lights.

Control Box Algorithm and Operation:

One problem associated with adding a light bar 10 having red, white and amber LEDs 46 is that a break light signal and a turn signal from the vehicle's electrical system is indistinguishable, but it is desirable for the light bar 10 to illuminate the amber LEDs 46A on the appropriate segment 16 of the light bar 10 for a turn signal while it is desirable to illuminate the red LEDs 46R of both segments 16 for a break light. In addition, to provide the maximum visibility and safety, it is desirable to illuminate both the red LEDs 46R of a segment 16 and the amber LEDs 46A when the breaks are applied while the turn signal is on. Yet, again, in many applications, the break and turning signals are indistinguishable from one another as they merely appear as power to a line through plug 60.

To accomplish this functionality, and separate the turn signals from break signals, microprocessor 64 and memory 66 of control box 22 use an algorithm that is capable of determining whether a signal is a break signal or a turn signal and from this determination the control box 22 illuminates the appropriate segment(s) 16 of light bar 10 and the appropriate color(s) of LEDs 46.

More specifically, in one arrangement, control box 22 receives power and four electrical operational signals from the electrical system of the vehicle 30. These four operational signals are: (1) a tail light signal (which is a low power signal on both the right tail light lead and the left tail light lead), (2) a reverse light signal, (3) a left blinker/brake signal, and (4) a right blinker/brake signal.

The reverse signal is simply a pass through signal. That is, when the reverse signal is received, the white LEDs 46W of both segments 16 are illuminated. Similarly, the tail light signal (meaning that the tail lights of the vehicle are to be illuminated at a low level, such as when the headlights are on) is also a pass through signal. That is, when the tail light signal is received, the red LEDs 46R of both segments 16 are illuminated, at a low illumination level. As such, there is essentially no need to perform processing on the reverse light signal and/or the tail light signal.

However, processing is required to determine whether a signal is a turn signal or a break signal. The algorithm processes three functions passed along in two wires; left turn signal which is represented as a blinking signal on the left signal lead; right turn signal which is represented as a blinking signal on a right signal lead; and brake signal which is represented as a solid or continuous signal simultaneously present on both the left and right signal leads. The right and left turn signals are mutually exclusive, but the brake signal can be present at any time for any duration.

The software algorithm uses memory of the current state and the recent past state of the right signal lead and the left signal lead to determine what function is most likely active at a point in time. That is whether it is a break signal or a turn signal. The algorithm observes the rate at which a turn signal is flashing to estimate when the next signal should arrive, and the algorithm acts accordingly if that signal either does or does not arrive. The software contains a state machine to take care of most situations, and also employs timers to keep certain states from running too long.

In addition, the algorithm adapts to the speed of the turn signal for each vehicle, so that if a nondeterministic state is incorrectly determined, the function only lasts the minimum time necessary. This reduces the time that an erroneous output is displayed (an output that may not be in sync with the vehicle). A brake released at just the right time may activate an errant turn signal, e.g., flash of the amber LEDs 46A of a segment 16. This functionality adds to the universal nature of the light bar.

As such, the control box 22 extrapolates these four electrical operational signals from the electrical system of vehicle 30 into the following functions using an algorithm:

Break Light: The control box 22 detects a simultaneous solid high-intensity illumination on both the right signal lead and the left signal lead. The control box 22 outputs a high intensity illumination on both segments 16 of red LEDs 46R.

Breaks Applied and Right Turn Signal Active: The control box 22 detects a constant signal on left turn signal lead and intermittent signal on the right turn signal lead. The control box 22 outputs a high intensity illumination on both segments 16 of red LEDs 46R while simultaneously outputting a flashing illumination of the amber LEDs 46A on the right segment 16 of light bar 10.

Breaks Applied and Left Turn Signal Active: The control box 22 detects a constant signal on right turn signal lead and intermittent signal on the left turn signal lead. The control box 22 outputs a high intensity illumination on both segments 16 of red LEDs 46R while simultaneously outputting a flashing illumination of the amber LEDs 46A on the left segment 16 of light bar 10.

No Break Applied and Right Turn Signal Active: The control box 22 does not detect a signal on the left turn signal lead while detecting an intermittent signal on the right turn signal lead. The control box 22 outputs a flashing illumination of the amber LEDs 46A on the right segment 16 of light bar 10.

No Break Applied and Left Turn Signal Active: The control box 22 does not detect a signal on the right turn signal lead while detecting an intermittent signal on the left turn signal lead. The control box 22 outputs a flashing illumination of the amber LEDs 46A on the left segment 16 of light bar 10.

Hazards: Detecting hazards is equivalent to detecting a break light signal. That is, the control box 22 detects a simultaneous solid high-intensity illumination on both the right signal lead and the left signal lead. The control box 22 outputs a high intensity illumination on both segments 16 of red LEDs 46R. In one arrangement, a timer function is used to detect the periodic illumination on both the right signal lead and the left signal lead and microprocessor 64 determines that this continued cycling of this signal is indeed a hazard signal and the microprocessor 64 instead illuminates that amber LEDs 46A until the periodic cycling ceases.

Figure 15:
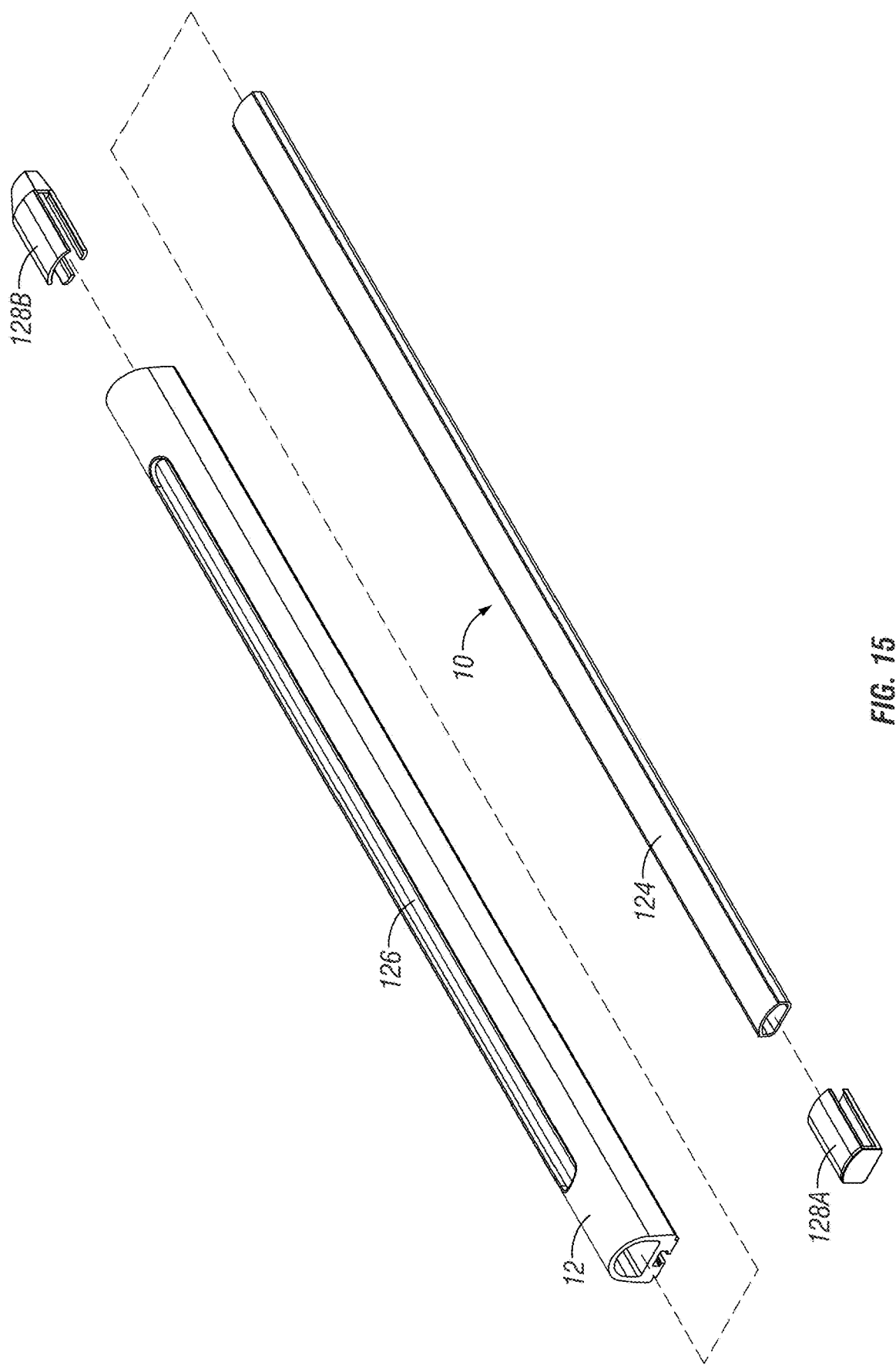
FIG. 15 shows a vehicle light bar system incorporating a thin-film-transistor liquid-crystal display (TFT LCD), according to some aspects of the present disclosure.

Thin-Film-Transistor Liquid-Crystal Display:

As shown in FIG. 15, the light bar 10 can employ a thin-film-transistor liquid-crystal display (TFT LCD) 124 in lieu of using LEDs 46. The TFT LCD 124 is a variant of a liquid-crystal display (LCD) that uses thin-film-transistor (TFT) technology to improve image qualities such as addressability and contrast. The TFT LCD 124 is an active matrix LCD, in contrast to passive matrix LCDs or simple, direct-driven LCDs with a few segments. In this way, the TFT LCD can be electrically separated into much smaller independently controllable portions or segments that emit light in response to control signals from the microprocessor 64.

In one embodiment, the relatively inexpensive twisted nematic (TN) display type can be used for the TFT LCD 124. The pixel response time on modern TN panels is sufficiently fast to avoid the shadow-trail and ghosting artifacts of earlier production. The more recent use of RTC (Response Time Compensation/Overdrive) technologies has allowed manufacturers to significantly reduce grey-to-grey (G2G) transitions, without significantly increasing the ISO response time. Response times are now quoted in G2G figures, with 4 ms and 2 ms now being commonplace for TN-based models. TN displays can suffer from limited viewing angles, especially in the vertical direction. Colors will shift when viewed off-perpendicular. In the vertical direction, colors will shift so much that they will invert past a certain angle.

In yet another embodiment, the in-plane switching (IPS) display type can be used for the TFT LCD 124. to improve on the poor viewing angle and the poor color reproduction of TN panels at that time. The IPS name comes from the main difference from TN panels: the crystal molecules move parallel to the panel plane instead of perpendicular to it. This change reduces the amount of light scattering in the matrix, which gives IPS its characteristic wide viewing angles and good color reproduction. Initial iterations of IPS technology were initially characterized by slow response time and a low contrast ratio but later revisions have made marked improvements to these shortcomings.

In yet another embodiment, the advanced fringe field switching (AFFS) display type can be used for the TFT LCD 124. AFFS is a technology similar to IPS or Super-IPS offering superior performance and color gamut with high luminosity. Color shift and deviation caused by light leakage is corrected by optimizing the white gamut, which also enhances white/grey reproduction.

In yet another embodiment, the plane line switching (PLS) display type can be used for the TFT LCD 124. The PLS display type bears similarities to IPS panels and touts improved viewing angles and image quality, increased brightness and lower production costs.

In yet another embodiment, the multi-domain vertical alignment (MVA) display type can be used for the TFT LCD 124. MVA achieves a fast pixel response, wide viewing angles, and high contrast at the cost of brightness and color reproduction. Modern MVA panels can offer wide viewing angles (second only to S-IPS technology), good black depth, good color reproduction and depth, and fast response times due to the use of response time compensation (RTC) technologies. When MVA panels are viewed off-perpendicular, colors will shift, but much less than for TN panels. The pixel response times of MVAs rise dramatically with small changes in brightness. Less expensive MVA panels can use dithering and frame rate control (FRC).

In yet another embodiment, the patterned vertical alignment (PVA) display type can be used for the TFT LCD 124. Less expensive PVA panels often use dithering and FRC, whereas super-PVA (S-PVA) panels all use at least 8 bits per color component and do not use color simulation methods. S-PVA also largely eliminated off-angle glowing of solid blacks and reduced the off-angle gamma shift.

In yet another embodiment, the advanced super view (ASV), also called axially symmetric vertical alignment, display type can be used for the TFT LCD 124. ASV is a VA mode where liquid crystal molecules orient perpendicular to the substrates in the off state. The bottom sub-pixel has continuously covered electrodes, while the upper one has a smaller area electrode in the center of the subpixel. When the field is on, the liquid crystal molecules start to tilt towards the center of the sub-pixels because of the electric field; as a result, a continuous pinwheel alignment (CPA) is formed; the azimuthal angle rotates 360 degrees continuously resulting in an excellent viewing angle. The ASV mode is also called CPA mode.

The TFT LCD 124 can be secured within the housing through first and second TFT LCD clips 128A, 128B. The first clip 128A can be a substantially rectangular clip have having sidewalls adjoined by a back wall. The second clip 128B can be similarly constructed yet can also have a tapered section towards an external portion of the clip. To mitigate poor viewing angles, a slight or significant portion of the housing 12 of the light bar can be removed to create a viewing window 126. Doing so helps focus light towards a location which can be easily seen by other drivers on a road and/or other viewers of automobile implementing the light bar system 10 described herein.

In use, the TFT LCD 124 is electrically connected to a controller and/or the electrical system of a vehicle 30. The TFT LCD 124 can feature one or more analog VGA, DVI, HDMI, or DisplayPort interface, with many featuring a selection of these interfaces. Inside external display devices there can be a controller board that will convert the video signal using color mapping and image scaling usually employing the discrete cosine transform (DCT) in order to convert any video source like CVBS, VGA, DVI, HDMI, etc. into digital RGB at the native resolution of the display panel. In a laptop the graphics chip will directly produce a signal suitable for connection to the built-in TFT display. A control mechanism for the backlight is usually included on the same controller board.

The low-level interface of STN, DSTN, or TFT display panels use either single ended TTL 5 V signal for older displays or TTL 3.3 V for slightly newer displays that transmits the pixel clock, horizontal sync, vertical sync, digital red, digital green, digital blue in parallel. Some models (for example the AT070TN92) also feature input/display enable, horizontal scan direction and vertical scan direction signals.

Because the TFT LCD 124 of the present disclosure will almost always be greater than 15 inches long, the TFT LCD 124 will often use low voltage differential signaling (LVDS) that transmits the same contents as the parallel interface (Hsync, Vsync, RGB) but will put control and RGB bits into a number of serial transmission lines synchronized to a clock whose rate is equal to the pixel rate. LVDS can transmit seven bits per clock per data line, with six bits being data and one bit used to signal if the other six bits need to be inverted in order to maintain DC balance. The TFT LCD 124 will, preferably, have three data lines and therefore only directly support 18 bits per pixel; and more preferably, have a fourth data line so they can support 24 bits per pixel, which delivers truecolor; and most preferably, have even more colors by adding a fifth lane to support 30 bits per pixel. According to another aspect of the present invention, LVDS with Internal DisplayPort and Embedded DisplayPort can be used, which allows sixfold reduction of the number of differential pairs.

Backlight intensity is usually controlled by varying a few volts DC, or generating a PWM signal, or adjusting a potentiometer or simply fixed. This in turn controls a high-voltage (1.3 kV) DC-AC inverter or a matrix of LEDs. The method to control the intensity of LEDs is to pulse them with PWM which can be source of harmonic flicker.

The bare display panel will only accept a digital video signal at the resolution determined by the panel pixel matrix designed at manufacture. Some screen panels will ignore the LSB bits of the color information to present a consistent interface.

With analogue signals like VGA, the display controller also needs to perform a high-speed analog to digital conversion. With digital input signals like DVI or HDMI some simple reordering of the bits is needed before feeding it to the rescaler if the input resolution doesn't match the display panel resolution.

The LCDs used in calculators and other devices with similarly simple displays have direct-driven image elements, and therefore a voltage can be easily applied across just one segment of these types of displays without interfering with the other segments. This can be impractical for the light bar system 10 of the present disclosure because the display would have a large number of (color) picture elements (pixels). Thus, potentially millions of connections would be required, both top and bottom for each one of the three colors (red, green and blue) of every pixel. To avoid this issue, the pixels of the TFT LCD 124 are addressed in rows and columns, reducing the connection count from millions down to thousands. The column and row wires attach to transistor switches, one for each pixel. The one-way current passing characteristic of the transistor prevents the charge that is being applied to each pixel from being drained between refreshes to the display's image. Each pixel is a small capacitor with a layer of insulating liquid crystal sandwiched between transparent conductive ITO layers.

The circuit layout process of the TFT LCD 124 is very similar to that of semiconductor products. However, rather than fabricating the transistors from silicon, that is formed into a crystalline silicon wafer, the TFT LCD 124 is made from a thin film of amorphous silicon that is deposited on a glass panel. The silicon layer for the TFT LCD 124 is typically deposited using the PECVD process. Transistors take up only a small fraction of the area of each pixel and the rest of the silicon film is etched away to allow light to easily pass through it. A polycrystalline silicon and/or amorphous silicon-based TFT can be used to increase TFT performance.

Programming of the Microcontroller:

The microprocessor 64 can be initially programmed to perform specific function(s) and/or strobe according to specific patterns and is thereafter at least partially restricted from being reprogrammed by a user to serve other function(s), either by restricting the emission of light in at least one color and/or preventing specific strobing pattern(s). The restriction can be caused by mechanical changes to the hardware, a control module that prevent lights of a certain color from being emitted, or by a software application which is compatible with the microprocessor 64.

A non-transitory computer readable medium may act as the primary means for programming which functions are capable of being carried out by the light bar 10. The non-transitory computer readable medium may be operated by person(s) considered to be the initial programmer, such as a manufacturer, which is generally a person other than the end user. The non-transitory computer readable medium can be a standalone device or can form part of a phone, gaming console, tablet, other computing device (e.g. laptop and desktop computers), or even a software application usable with a computing device such as a web browser. The programmer is the one who sets which functions the microprocessor 64 allows or restricts the light bar 10 to perform.

Figure 18:
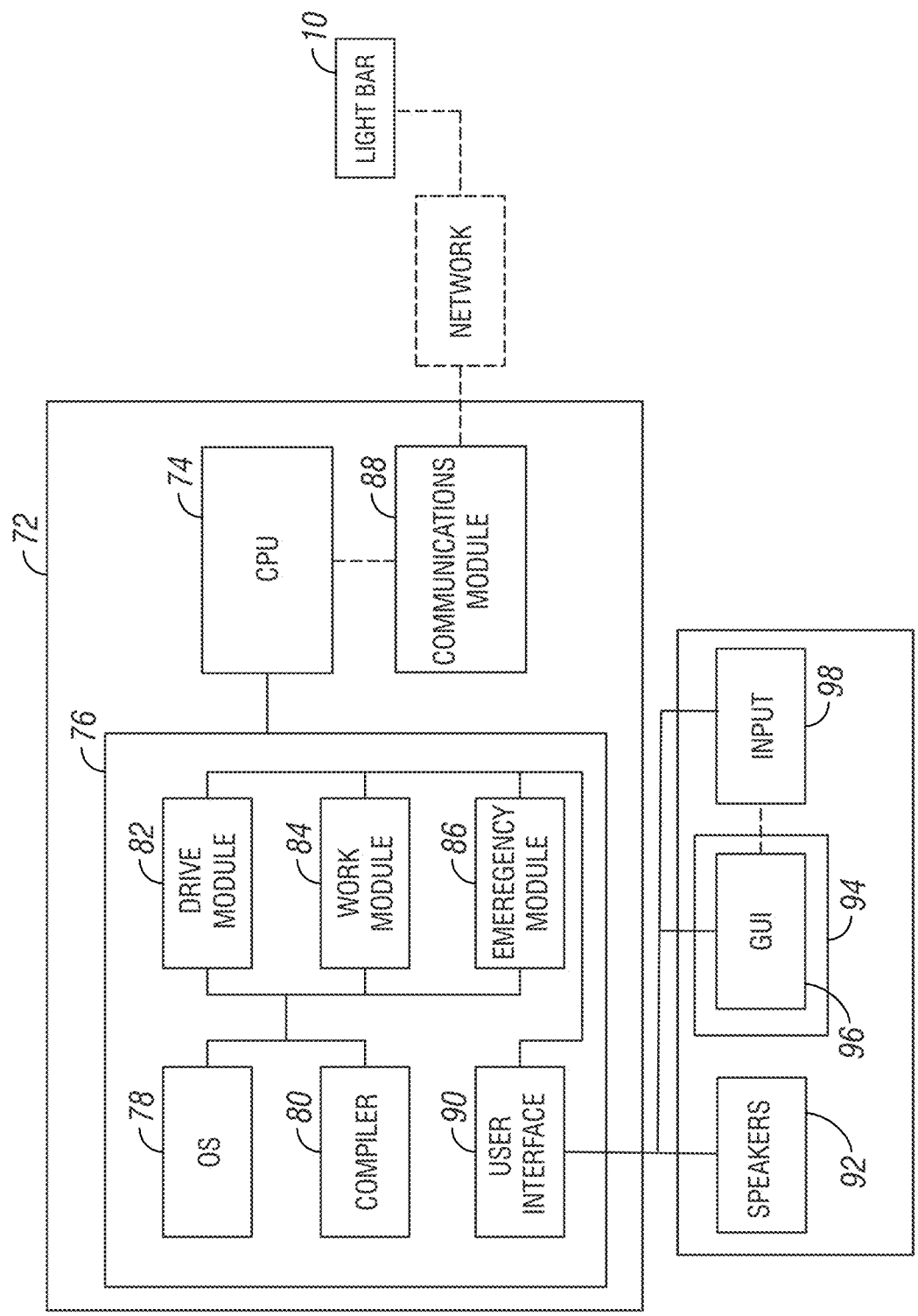
FIG. 18 shows a diagram illustrating an exemplary hardware environment for practicing the present invention, according to some aspects of the present disclosure.

For example, as shown in FIG. 18, an exemplary non-transitory computer readable medium 72 that could be used to implement selected elements of the present invention includes a central processing unit 74 operatively connected to a memory 76.

The central processing unit 74 may include components such as an intelligent control and communication components (e.g., communications module 88). The central processing unit processes inputs and outputs and is capable of interfacing with many different types of modules 82, 84, 86 and a user interface 90. Examples of a central processing unit include a processor, a microprocessor, a microcontroller, an arithmetic logic unit ("ALU"), or any other suitable programmable device. The central processing unit 74 could even include other components and can be implemented partially or entirely on a semiconductor (e.g., a field-programmable gate array ("FPGA")) chip, such as a chip developed through a register transfer level ("RTL") design process.

The memory 76 includes, in some embodiments, a program storage area and a data storage area. The program storage area and the data storage area can include combinations of different types of memory, such as read-only memory ("ROM", an example of non-volatile memory, meaning it does not lose data when it is not connected to a power source) or random access memory ("RAM", an example of volatile memory, meaning it will lose its data when not connected to a power source). Some additional examples of volatile memory include static RAM ("SRAM"), dynamic RAM ("DRAM"), synchronous DRAM ("SDRAM"), etc. Additional examples of non-volatile memory include electrically erasable programmable read only memory ("EEPROM"), flash memory, a hard disk, an SD card, etc. The central processing unit 74 executes software instructions that are capable of being stored in the memory 76.

Generally, the non-transitory computer readable medium 72 operates under control of an operating system 78 stored in the memory 76. The non-transitory computer readable medium 72 implements a compiler 80 which allows a software application written in a programming language such as COBOL, C++, FORTRAN, or any other known programming language to be translated into code readable by the central processing unit 74. After completion, the software application accesses and manipulates data stored in the memory 76 of the non-transitory computer readable medium 72 using the relationships and logic that was generated using the compiler 80.

In one embodiment, instructions implementing the operating system 78, a software application, and the compiler 80 are tangibly embodied in the non-transitory computer readable medium 72, which could include one or more fixed or removable data storage devices, such as a zip drive, floppy disc drive, hard drive, CD-ROM drive, tape drive, etc. Furthermore, the operating system 78 and the software application are comprised of instructions which, when read and executed by the non-transitory computer readable medium 72, causes the non-transitory computer readable medium 72 to perform the steps necessary to implement and/or use the present invention (e.g. give or restrict functionality to the light bar 10).

A software application and/or operating instructions may also be tangibly embodied in the memory 76 and/or a communications module 88, thereby making the software application a product or article of manufacture according to the present invention.

For example, in a preferred embodiment, the program storage area and/or data storage areas comprise a drive module 82, a work module 84, and an emergency module 86. The modules give the programmer the ability to quickly and turn on and off certain functionalities from the light bar 10. To the end user of the light bar 10, these changes would appear permanent.

For example, the drive module 82, would disable at least the blue colored LEDs from emitting light. The drive module 82 can be specifically designed to replicate or enhance traditional lighting patterns for driving. More particularly, the drive module 82 would tell the microcontroller to feature a white reverse light, amber turn signals, a red running light, a red brake light, and red hazards. In yet another embodiment, the amber turn signals could be substituted for white or red colored turn signals to reduce the available colors from three to two.

The work module 84 can be specifically designed to replicate or enhance traditional lighting patterns for work vehicles. More particularly, the work module 84 would tell the microcontroller 64 to feature an amber strobe, a blue strobe, a white strobe, and any combination thereof.

The emergency module 86 can be specifically designed to replicate or enhance traditional lighting patterns for emergency vehicles, such as police cars and ambulances. More particularly, the emergency module 84 would tell the microcontroller 64 to feature a red strobe, a blue strobe, a white strobe, and any combination thereof. It should be appreciated that each module 82, 84, 86 can also include submodules which program the microcontroller 64 to emit any one or more of the colors of lights according to specific strobing patterns in accordance with what has been described in the Control Box section of the present disclosure, at specific times, for specific durations, or even at specific speeds (or frequencies).

Furthermore, the programming of any one or more of these modules may include a priority, where the lighting patterns and/or strobes associated therewith will either override or be disabled in the event certain driving functions are occurring (e.g., braking, turning, etc.). If two light bars 10 are used on a single vehicle, one could be programmed such that lighting patterns associated with normal driving operations override the other available strobing patterns programmed to be carried out by the light bar 10 and the other could be programmed such that the other available strobing patterns programmed to be carried out by the light bar 10 override the lighting patterns associated with normal driving operations.

The communications module 88 can comprise data communication devices to allow the non-transitory computer readable medium 72 to connect to a network. The network, for example, may also be connected to the Internet, the light bar 10, other electronic devices, and/or an electronic database.

In some embodiments, the network is, by way of example only, a wide area network ("WAN") such as a TCP/IP based network or a cellular network, a local area network ("LAN"), a neighborhood area network ("NAN"), a home area network ("HAN"), or a personal area network ("PAN") employing any of a variety of communications protocols, such as Wi-Fi, Bluetooth, ZigBee, near field communication ("NFC"), etc., although other types of networks are possible and are contemplated herein. The network typically allows communication between the communications module 88 and a central location during moments of low-quality connections. Communications through the network can be protected using one or more encryption techniques, such as those techniques provided in the IEEE 802.1 standard for port-based network security, pre-shared key, Extensible Authentication Protocol ("EAP"), Wired Equivalent Privacy ("WEP"), Temporal Key Integrity Protocol ("TKIP"), Wi-Fi Protected Access ("WPA"), and the like.

In some embodiments, the non-transitory computer readable medium 72 could include one or more communications ports such as Ethernet, serial advanced technology attachment ("SATA"), universal serial bus ("USB"), or integrated drive electronics ("IDE"), for transferring, receiving, or storing data.

The non-transitory computer readable medium 72 interfaces with the programmer to accept input(s) and commands through at least part of the user interface 90. Although the user interface 90 is depicted a collection of input receiving components, the instructions performing the user interface functions can be resident or distributed in the operating system 78, another software application, or module. Alternatively, the instructions can be implemented with special purpose memory and processors.

The user interface 90 is how the programmer interacts with the non-transitory computer readable medium 72. The user interface 90 could be a digital interface, a command-line interface, a graphical user interface ("GUI") 96, or any other way a user can interact with a machine. For example, in a preferred embodiment, the user interface 90 comprises speakers 92, a display 94, and one or more means for receiving an input 98 from the programmer. The speakers 92 can transmit audio in response to instructions received from the operating system 78, the non-transitory computer readable medium 72, the drive module 82, the work module 84, the emergency module 86, the communications module 88, and/or the user interface 90.

The display 94 typically comprises an electronic screen which projects a graphical user interface 96 to the programmer. More particularly, the display could be a liquid crystal display ("LCD"), a light-emitting diode ("LED") display, an organic LED ("OLED") display, an electroluminescent display ("ELD"), a surface-conduction electron emitter display ("SED"), a field-emission display ("FED"), a thin-film transistor ("TFT") LCD, a bistable cholesteric reflective display (i.e., e-paper), etc. The graphical user interface 94 in response to instructions received from the operating system 78, the drive module 82, the work module 84, the emergency module 86, the communications module 88, and/or the user interface 90.

The means for receiving an input 98 can comprise a combination of digital and analog input and/or output devices or any other type of user interface input/output device required to achieve a desired level of control and monitoring for a device. Examples of input and/or output devices include computer mice, keyboards, touchscreens, knobs, dials, switches, buttons, etc. Input(s) 98 received from the user interface 90 can then be sent to the microcontroller 64 to control operational aspects of the light bar 10.

From the foregoing, it can be seen that the present invention accomplishes at least all of the stated objectives.

LIST OF REFERENCE NUMERALS

The following reference numerals and descriptors are not exhaustive, nor limiting, and include reasonable equivalents. If possible, elements identified by a reference numeral may replace or supplement any element identified by another reference numeral.

10 light bar system
12 housing
14 circuit board
16 segments
18 end caps
20 encapsulant
22 control box
24 microprocessor 26 memory
28 clips
30 truck or vehicle
32 backwall
34 sidewalls
36 cover portion
38 features
40 hollow interior
42 front transparent portion
44 back non-transparent portion
46 LEDs
48 backing material
50 circuitry layer
54 seamline
55 exterior facing surface
56 wiring
58 fuse
60 plug
62 signal lead
63 ribbon wire
64 microprocessor
66 memory
68 high efficiency step down controller
70 remote control
72 non-transitory computer readable medium
74 central processing unit
76 memory
78 operating system
80 compiler
82 drive module
84 work module
86 emergency module
88 communications module
90 user interface
92 speakers
94 display, e.g., a touchscreen display
96 graphical user interface
98 input
100 backwall
102 opposing end walls
104 opposing side walls
106 rearward face
108 rearward face
110 arms
112 locking feature
114 guiding surface
116 opening
120 first layer
122 second layer
124 TFT LCD
126 viewing window
128A first TFT LCD clip
128B second TFT LCD clip
130 support bar
132 SMD assembly
134 grouping of SMD assemblies
136 microprocessor
138 first surface
140 second surface
R# resistor
C# capacitor The present disclosure is not to be limited to the particular embodiments described herein. The following claims set forth a number of the embodiments of the present disclosure with greater particularity.

The invention claimed is:

1. A vehicle light bar comprising:
a circuit board positioned within a housing;
surface-mount device SMD assemblies, each SMD assembly comprising:
   a white colored light emitting diode (LED);
   at least three differently colored LEDs arranged:
      (a) in-line;
      (b) perpendicular to a longitudinal axis of the vehicle light bar; and
      (c) positioned below the white colored LED;
   several resistors; and
   a capacitor;
   wherein said SMD assemblies are mounted to a surface of the circuit board with surface-mount technology (SMT); and
   wherein the LEDs are capable of transmitting and varying an intensity of light in at least three different colors of an additive color model;
the housing having wiring electrically connected to a control box, said control box including logic for automatically and independently illuminating each of the LEDs and a processor, said processor programmed to control light emission according to one or more selected strobing patterns.

2. The vehicle light bar of claim 1 wherein space between an outward facing surface of the circuit board and an inward facing surface of the housing is filled with an encapsulant thereby sealing the LEDs within the housing.

3. The vehicle light bar of claim 2 wherein the encapsulant is formed of a flowable plastic injected into space between the outward facing surface of the circuit board and the inward facing surface of the housing.

4. The vehicle light bar of claim 1 wherein a portion of the housing covering the LEDs is formed of a transparent or translucent plastic material.

5. The vehicle light bar of claim 1 wherein the housing is formed of a back wall, a pair of opposing sidewalls and a cover, wherein the cover is formed of a convex curved shape.

6. The vehicle light bar of claim 1 wherein the outward facing surface of the circuit board is black in color thereby minimizing the noticeability of the vehicle light bar when not in operation.

7. The vehicle light bar of claim 1 wherein the wiring includes a fuse and a signal lead at an end of the vehicle light bar.

8. The vehicle light bar of claim 1 wherein the wiring comprises gold.

9. The vehicle light bar of claim 1 wherein the SMD assemblies have no leads.

10. The vehicle light bar of claim 1 wherein the at least three differently colored LEDs comprise a red LED, a blue LED, and a green LED.

11. The vehicle light bar of claim 10 wherein the microprocessor is programmed to automatically illuminate red light while breaking, amber light while the vehicle intends to turn, and white light while the vehicle is driven in reverse.

12. The vehicle light bar of claim 10 wherein the microprocessor is programmed to illuminate blue light, white light, and red light during an emergency.

13. The vehicle light bar of claim 10 wherein the microprocessor is programmed to illuminate amber light and white light during work or construction related tasks.

14. The vehicle light bar of claim 10 wherein the SMD assemblies form groupings which are controlled by separate microprocessors.

15. The vehicle light bar of claim 14 wherein each of the groupings comprises three SMD assemblies.

16. The vehicle light bar of claim 1 wherein:
the controller is further configured to select between colors or strobing patterns in response to receiving the signals from the electrical system of the vehicle; and
the controller is further configured to select the duration of illumination of the LEDs in response to receiving the signals from the electrical system of the vehicle.

17. The vehicle light bar of claim 16 wherein a selected color or strobing pattern is emergency related or construction related.

18. The vehicle light bar of claim 16 wherein a selected color or strobing pattern is selectable by way of a user interface utilizing a touchscreen.

19. A method of manufacturing a vehicle light bar comprising:
mounting surface-mount device (SMD) assemblies to a surface of the circuit board with surface-mount technology (SMT);
wherein each SMD assembly comprises:
a white colored light emitting diode (LED);
at least three differently colored LEDs arranged:
(a) in-line;
(b) perpendicular to a longitudinal axis of the vehicle light bar; and
(c) positioned below the white colored LED;
several resistors; and
a capacitor;
electrically connecting a controller to the LEDs, said controller having a processor and memory;
configuring the controller to receive signals from the electrical system of the vehicle, interpret the signals received from the electrical system of the vehicle, and in response automatically control illumination of the LEDs;
programming the microprocessor to control light emission according to one or more selected strobing patterns and/or in one or more colors; and
wherein the controller includes logic for automatically and independently illuminating the LEDs, said LEDs capable of transmitting and varying an intensity of light in at least three different colors of an additive color model.

20. The method of claim 19 further comprising:
mounting the vehicle light bar onto a vehicle, a support bar attached to the vehicle, and/or an accessory of the vehicle; and
electrically connecting the controller to an electrical system of the vehicle.

* * * * *